United States Patent
Rico Alvarino et al.

(10) Patent No.: US 10,200,102 B2
(45) Date of Patent: Feb. 5, 2019

(54) CHANNEL STATION INFORMATION REPORTING AND TRANSMISSION MODE FOR ENHANCED MACHINE TYPE COMMUNICATION

(71) Applicant: QUALCOMM Incorporated, San Diego, CA (US)

(72) Inventors: Alberto Rico Alvarino, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 15/192,452

(22) Filed: Jun. 24, 2016

(65) Prior Publication Data

US 2017/0141831 A1    May 18, 2017

Related U.S. Application Data

(60) Provisional application No. 62/254,845, filed on Nov. 13, 2015.

(51) Int. Cl.
  *H04B 7/06*   (2006.01)
  *H04W 4/70*   (2018.01)
  *H04B 7/0456* (2017.01)

(52) U.S. Cl.
  CPC ......... *H04B 7/0626* (2013.01); *H04B 7/0486* (2013.01); *H04B 7/063* (2013.01);
  (Continued)

(58) Field of Classification Search
  None
  See application file for complete search history.

(56) References Cited

U.S. PATENT DOCUMENTS 8,982,808 B2 *   3/2015   Wan ............... H04L 5/0035
                                                   370/329
9,167,585 B2 *  10/2015   Sayana ........... H04W 72/048
(Continued)

FOREIGN PATENT DOCUMENTS

WO   WO-2015012653 A1   1/2015

OTHER PUBLICATIONS

ISA/EP, International Search Report and Written Opinion of the International Searching Authority, Int'l Application No. PCT/US2016/052423, dated Dec. 9, 2016, European Patent Office, Rijswijk, NL, 13 pgs.

(Continued)

*Primary Examiner* — Hong S Cho
(74) *Attorney, Agent, or Firm* — Holland & Hart LLP/Qualcomm

(57) ABSTRACT

Methods, systems, and devices for wireless communication are described. A wireless device may identify a transmission mode that specifies a rank indicator (RI) feedback parameter for channel state indicator (CSI) reporting, and may determine that the appropriate CSI configuration excludes an RI. The device may then send CSI reports with a precoding matrix indicator (PMI) and without the RI, and it may communicate using the transmission mode. In some cases, the PMI may be based on a default rank (e.g., rank of 1 for device with single antenna). In some cases, a category or capability of the device may be identified, and the determination that the CSI configuration excludes the RI may be based on the category or capability. In other cases, the CSI configuration may be based on channel conditions. In some cases, a reference signal (e.g., a CRS) may be used as feedback depending on the device's capabilities.

18 Claims, 16 Drawing Sheets

(52) U.S. Cl.
CPC ......... *H04B 7/0632* (2013.01); *H04B 7/0639* (2013.01); *H04W 4/70* (2018.02)

(56) References Cited

U.S. PATENT DOCUMENTS

| | | | | |
|---|---|---|---|---|
| 2012/0207105 | A1* | 8/2012 | Geirhofer | H04L 5/0032 370/329 |
| 2012/0218948 | A1* | 8/2012 | Onggosanusi | H04L 1/0031 370/329 |
| 2012/0307648 | A1* | 12/2012 | Okubo | H04W 72/06 370/241 |
| 2012/0320832 | A1* | 12/2012 | Kim | H04L 1/0026 370/328 |
| 2013/0083753 | A1* | 4/2013 | Lee | H04W 72/0453 370/329 |
| 2013/0230007 | A1* | 9/2013 | Nagata | H04L 1/0026 370/329 |
| 2013/0315337 | A1* | 11/2013 | Dai | H04L 1/0031 375/267 |
| 2014/0146907 | A1* | 5/2014 | Kim | H04B 7/0413 375/267 |
| 2015/0223161 | A1 | 8/2015 | Xiao et al. | |
| 2016/0029351 | A1* | 1/2016 | Shimezawa | H04L 5/0053 370/329 |
| 2016/0182208 | A1* | 6/2016 | Yi | H04L 1/0026 370/329 |

OTHER PUBLICATIONS

Research In Motion UK Limited, "Clarification of Rel-10 UE Category and MIMO Layer Capability Definition," 3GPP TSG RAN WG2 Meeting #72bis, R2-110224, Dublin, Ireland, Jan. 17-21, 2011, 4 pgs., XP050474659, 3rd Generation Partnership Project.

* cited by examiner

CHANNEL STATION INFORMATION REPORTING AND TRANSMISSION MODE FOR ENHANCED MACHINE TYPE COMMUNICATION

CROSS REFERENCE

The present application for patent claims priority to U.S. Provisional Patent Application No. 62/254,845 by Rico Alvarino et al., entitled "Channel Station Information Reporting and Transmission Mode for Enhanced Machine Type Communication," filed Nov. 13, 2015, assigned to the assignee hereof, and expressly incorporated by reference herein in its entirety.

BACKGROUND

The following relates generally to wireless communication and more specifically to channel state information (CSI) reporting and transmission mode for enhanced machine type communication (MTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

In some cases, a UE may be a low cost or low complexity device (e.g., an MTC device). For example, the UE may have a single antenna and may communicate with a base station using a transmission mode that is also used for devices with multiple antennas. Channel feedback rules, including CSI reporting, specified by the transmission mode may be based on or selected for communication with the multi-antenna devices without regard to impacts on the low cost, low complexity UEs within the system.

SUMMARY

A low complexity wireless device may identify a transmission mode that specifies a rank indicator (RI) feedback parameter for channel state indicator (CSI) reporting, but may determine that the appropriate CSI configuration excludes an RI. The device may then send CSI reports with a precoding matrix indicator (PMI) without the RI and may continue to communicate using the transmission mode. In some cases, the PMI may be based on a default rank (e.g., a rank of one for a device with a single antenna). In some cases, a user equipment (UE) category may be identified and the determination that the CSI configuration excludes the RI may be based at least in part on the UE category. In other cases, the CSI configuration may be based on channel conditions.

A method of wireless communication is described. The method may include identifying a transmission mode that specifies a rank indicator (RI) feedback parameter for channel state information (CSI) reporting, determining that a CSI configuration excludes an RI and communicating using the transmission mode according to the CSI configuration.

An apparatus for wireless communication is described. The apparatus may include means for identifying a transmission mode that specifies an RI feedback parameter for CSI reporting, means for determining that a CSI configuration excludes an RI and means for communicating using the transmission mode according to the CSI configuration.

A further apparatus is described. The apparatus may include a processor, memory in electronic communication with the processor, and instructions stored in the memory. The instructions may be operable to cause the processor to identify a transmission mode that specifies an RI feedback parameter for CSI reporting, determine that a CSI configuration excludes an RI and communicate using the transmission mode according to the CSI configuration.

A non-transitory computer readable medium for wireless communication is described. The non-transitory computer-readable medium may include instructions to cause a processor to identify a transmission mode that specifies an RI feedback parameter for CSI reporting, determine that a CSI configuration excludes an RI and communicate using the transmission mode according to the CSI configuration.

Some examples of the method, apparatus, or non-transitory computer-readable medium described above may further include processes, features, means, or instructions for transmitting a CSI report based on the CSI configuration, where the communicating comprises receiving downlink (DL) signaling based on the CSI report.

In some examples of the method, apparatus, or non-transitory computer-readable medium described above, the CSI report comprises a precoding matrix indicator (PMI), and where the PMI is based on the RI.

Some examples of the method, apparatus, or non-transitory computer-readable medium described above may further include processes, features, means, or instructions for receiving a CSI report based on the CSI configuration, where the communicating comprises transmitting DL signaling based on the CSI report.

In some examples of the method, apparatus, or non-transitory computer-readable medium described above, the CSI report comprises a PMI, and where the PMI is based on the RI.

Some examples of the method, apparatus, or non-transitory computer-readable medium described above may further include processes, features, means, or instructions for identifying a UE category, where the determination that the CSI configuration excludes the RI is based on the UE category.

Some examples of the method, apparatus, or non-transitory computer-readable medium described above may further include processes, features, means, or instructions for transmitting an indication of the UE category, where the indication of the UE category is indicative of a rank.

Some examples of the method, apparatus, or non-transitory computer-readable medium described above may further include processes, features, means, or instructions for receiving an indication of the UE category, where the indication of UE category is indicative of a rank.

Some examples of the method, apparatus, or non-transitory computer-readable medium described above may further include processes, features, means, or instructions for receiving radio resource control (RRC) signaling that indicates the CSI configuration.

In some examples of the method, apparatus, or non-transitory computer-readable medium described above, the communicating comprises transmitting a PMI according to the CSI configuration, where the PMI is associated with a default rank indicator configured by the RRC signaling.

Some examples of the method, apparatus, or non-transitory computer-readable medium described above may further include processes, features, means, or instructions for transmitting RRC signaling that indicates the CSI configuration.

In some examples of the method, apparatus, or non-transitory computer-readable medium described above, the communicating comprises receiving a PMI according to the CSI configuration, where the PMI is associated with a default rank indicator configured by the RRC signaling.

Some examples of the method, apparatus, or non-transitory computer-readable medium described above may further include processes, features, means, or instructions for determining that a channel condition parameter is below a threshold, where the determination that the CSI configuration excludes the RI is based on the determination that the channel condition parameter is below the threshold.

Some examples of the method, apparatus, or non-transitory computer-readable medium described above may further include processes, features, means, or instructions for identifying an RI index, where the determination that the CSI configuration excludes the RI is based on the RI index.

Some examples of the method, apparatus, or non-transitory computer-readable medium described above may further include processes, features, means, or instructions for estimating a matrix representative of a channel for the communicating, selecting a PMI based on a default RI, and determining a channel quality indicator (CQI) that corresponds to the PMI, where the communicating comprises transmitting the CQI and the PMI.

In some examples of the method, apparatus, or non-transitory computer-readable medium described above, the CSI configuration comprises a periodic reporting configuration and the communicating comprises: transmitting at least one of a PMI, an RI, or a CQI using a control channel if the PMI, RI or CQI are available for transmission and refraining from transmitting the control channel if the PMI, RI or CQI are unavailable for transmission.

In some examples of the method, apparatus, or non-transitory computer-readable medium described above, the CSI configuration comprises a periodic reporting configuration and the communicating comprises identifying a collision between a CSI report and an uplink transmission scheduled for a shared channel. Some examples of the method, apparatus, or non-transitory computer-readable medium described above may further include processes, features, means, or instructions for transmitting a PMI using the shared channel.

In some examples of the method, apparatus, or non-transitory computer-readable medium described above, the CSI configuration comprises an aperiodic reporting configuration associated with a downlink control information (DCI) format of the transmission mode and the communicating comprises transmitting a PMI using a shared channel.

Some examples of the method, apparatus, or non-transitory computer-readable medium described above may further include processes, features, means, or instructions for identifying a reference signal type to use for channel estimation based on a category of a UE. Some examples of the method, apparatus, or non-transitory computer-readable medium described above may further include processes, features, means, or instructions for determining at least one of a PMI or a CQI using a reference signal of the identified reference signal type, where the communicating comprises transmitting the PMI or the CQI.

In some examples of the method, apparatus, or non-transitory computer-readable medium described above, the identified reference signal type comprises a cell-specific reference signals (CRS).

DETAILED DESCRIPTION

Figure 1:
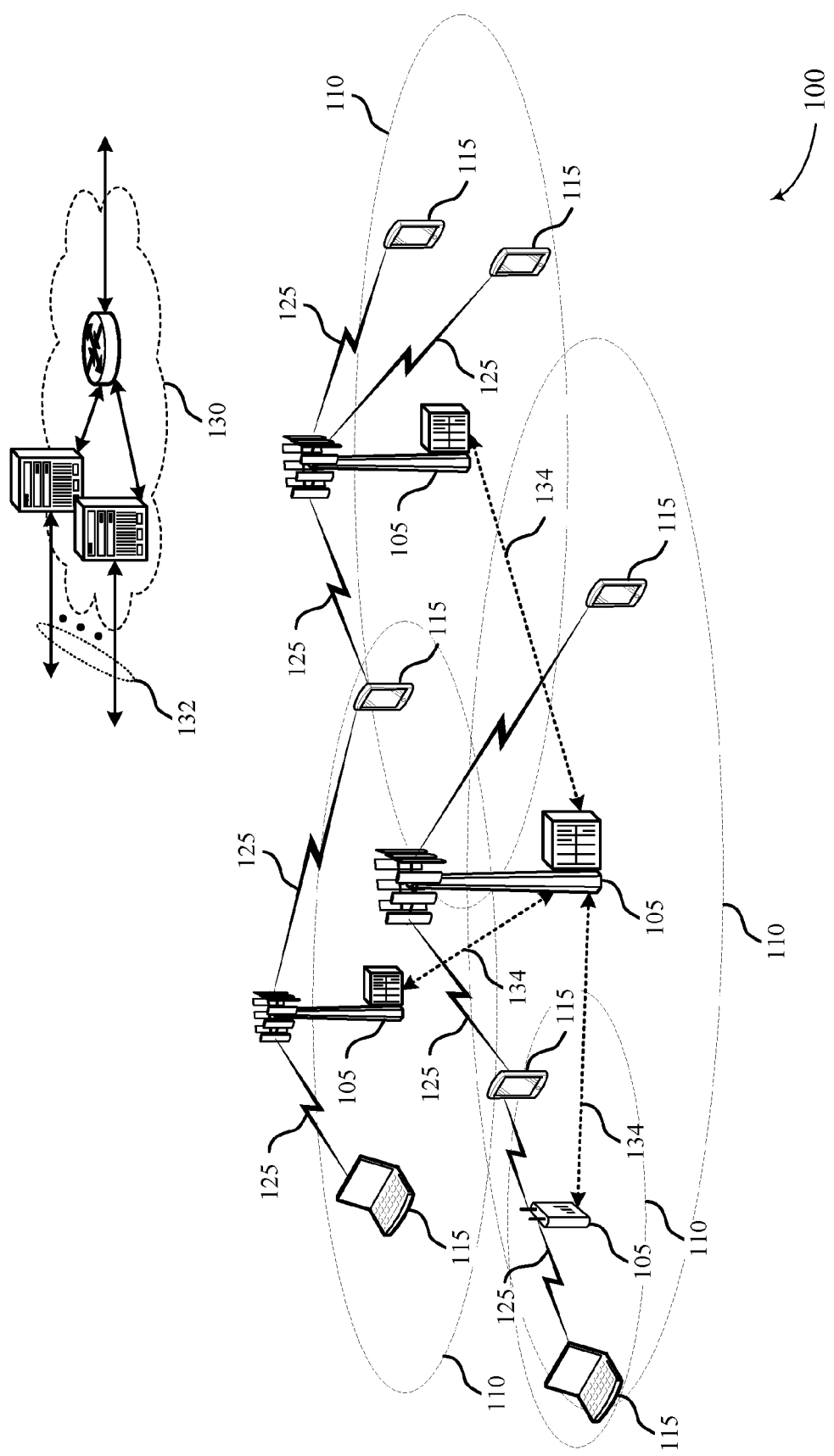
FIG. 1 illustrates an example of a wireless communications system that supports channel state information (CSI) reporting for enhanced machine type communication (MTC) in accordance with aspects of the present disclosure.

Some wireless communications systems may support the use of multiple configurations for communication involving one antenna or multiple antennas at the transmitter and receiver. Each configuration may be referred to as a transmission mode, and may be based on single input-single output (SISO) operation, multiple input-multiple output (MIMO) operation, or other combinations of single or multiple inputs and outputs. The choice of transmission mode may be based on the capabilities of the devices (e.g., on a user equipment (UE) category) operating in or channel conditions within a system.

The capabilities of the various devices within the system, or the particular channel conditions of the system, may affect the overhead of a particular device operating with a particular transmission mode. By way of example, feedback specified by a transmission mode designed for multi-antenna devices may result in excess signaling overhead or undesirable power consumption for lower complexity (e.g., single antenna) devices. So devices may provide feedback irrespective of feedback parameters specified by a transmission mode in an effort to reduce overhead or power consumption, for instance.

Different transmission modes may be associated with different control signals and reference signals. For example, different transmission modes may utilize different channel state information (CSI) reporting configurations. In some cases, wireless devices may use rank indication (RI) feedback in a CSI report to determine how many communication layers will be used. In some cases, the reference signal used for CSI calculation may depend on the transmission mode. This may allow the base station to communicate with the UE more efficiently.

A base station may communicate with different UEs using different transmission modes. For example, some wireless systems may also support the operation of enhanced machine-type-communication (eMTC) UEs, which may be associated with rank 1 (i.e., single layer) communications due to low cost design and reduced complexity (e.g., eMTC UEs may have a single antenna). For a UE with a single antenna, which may continuously use rank 1, transmitting RI (e.g., repeatedly) may result in excess signaling overhead and increased power consumption. In some cases, the CSI calculation procedure in a UE may be modified depending on the UE capability.

In some cases, a UE may be configured to report both a precoding matrix indicator (PMI) and RI, but may not report these indications separately. That is, each CSI report or series of reports may contain both PMI information and RI information. But in some cases, PMI may be reported separately and rank may be determined without an explicit RI signaling. For example, communicating PMI without RI may be used for UEs with a single antenna or for UEs in poor channel conditions. In some instances, due to a particular UE associated with a low complexity category (e.g., an eMTC UE), or operating under poor channel conditions, the RI would not be expected to be more than 1. Accordingly, RI signaling (e.g. explicit signaling) may be omitted in a CSI report in such circumstances to reduce signaling overhead, power consumption, other factors, or some combination.

Aspects of the disclosure introduced above are described below in the context of a wireless communication system. Aspects of the disclosure are further illustrated by and described with reference to apparatus diagrams, system diagrams, and flowcharts that relate to modified CSI reporting for enhanced MTC.

FIG. 1 illustrates an example of a wireless communications system 100 that supports CSI reporting for enhanced MTC in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communication systems 100 may support transmission of CSI reports by low complexity UEs 115 that include precoding matrix information (PMI) but do not include a rank indicator (RI). Wireless communications system 100 may also support communications with other UEs 115 that provide RI as may be specified by a transmission mode used for both low complexity and multi-antenna UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like. Some of the UEs 115 may be referred to as low complexity or low cost UEs 115 and may have a single receive antenna.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Some types of wireless devices may provide for automated communication. Automated wireless devices may include those implementing Machine-to-Machine (M2M) communication or Machine Type Communication (MTC). M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Additionally, M2M or MTC may also refer to communications from devices that rely on low complexity and/or low power consumption (e.g., wearables).

Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical (PHY) access control, and transaction-based business charging. An MTC device may operate using half-duplex (one-way) communications at a reduced peak rate. MTC devices may also be configured to enter a power saving "deep sleep" mode when not engaging in active communications.

A base station 105 may gather channel condition information from a UE 115 in order to efficiently configure and schedule the channel. This information may be sent from the UE 115 in the form of a channel state report. A channel state report may contain a rank indicator (RI) requesting a number of layers to be used for DL transmissions (e.g., based on the antenna ports of the UE 115), a PMI indicating a preference for which precoder matrix should be used (based on the number of layers), and a CQI representing the highest modulation and coding scheme (MCS) that may be used. CQI may be calculated by a UE 115 after receiving predetermined pilot symbols such as CRS or CSI-RS. RI may be excluded if the UE 115 does not support spatial multiplexing (or is not in spatial multiplexing mode). In some cases, the CSI (including the RI) may be transmitted over a physical uplink control channel (PUCCH) or the physical uplink shared channel (PUSCH), and may be triggered in a periodic or aperiodic manner.

The types of information included in the report determines a reporting type. Channel state reports may be periodic or aperiodic. That is, a base station 105 may configure a UE 115 to send periodic reports at regular intervals, and may also request additional reports as needed. A periodic report may include wideband reports indicating the channel quality across an entire cell bandwidth, UE selected reports indicating a subset of the best subbands, or configured reports in which the subbands reported are selected by the base station 105.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements (RE) in each resource block (RB) based on the number of antenna ports or layers (up to 4) of the receiving UEs 115. In addition to CRS, which may be utilized by all UEs 115 in the geographic coverage area 110 of the base station 105, demodulation reference signal (DMRS) may be directed toward specific UEs 115 and may be transmitted on RBs assigned to those UEs 115.

DMRS may include signals on 6 REs in each RB in which they are transmitted. The DM-RS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as CSI reference signals (CSI-RS) may be included to aid in generating CSI. On the UL, a UE 115 may transmit a combination of periodic sounding reference signal (SRS) and UL DMRS for link adaptation and demodulation, respectively.

Thus, a low complexity UE 115 may identify a transmission mode that specifies an RI feedback parameter for CSI reporting, but may determine that the appropriate CSI configuration excludes an RI. The UE 115 may then send CSI reports with a PMI, but without the RI and continue to communicate using the transmission mode. In some cases the PMI may be based on a default rank (e.g., a rank of one for a device with a single antenna). In some cases, a UE category may be identified and the determination that the CSI configuration excludes the RI may be based at least in part on the UE category. In other cases, the CSI configuration may be based on channel conditions.

Figure 2:
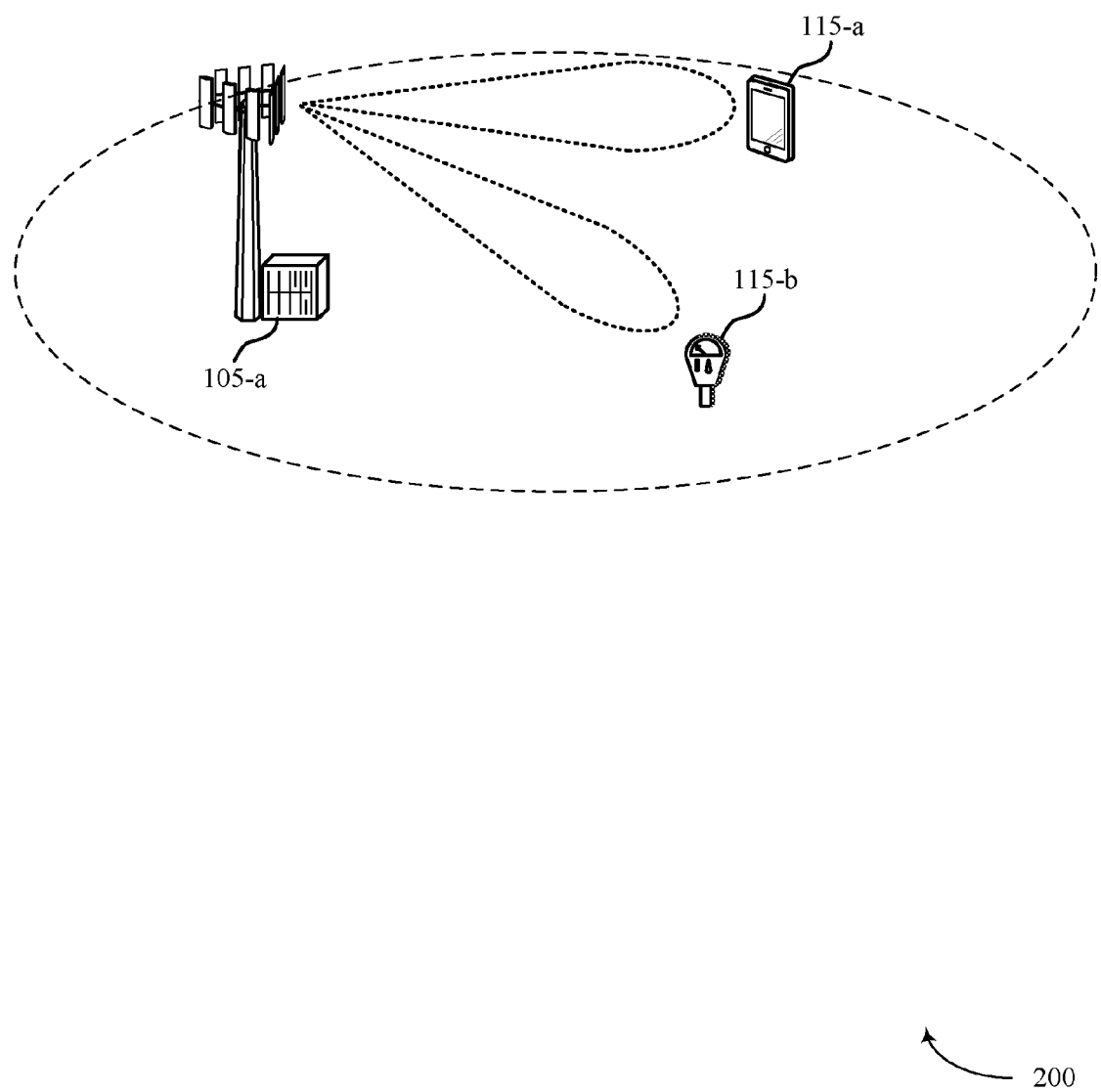
FIG. 2 illustrates an example of a wireless communications system that supports CSI reporting for enhanced MTC in accordance with aspects of the present disclosure.

FIG. 2 illustrates an example of a wireless communications system 200 for CSI reporting for enhanced MTC. Wireless communications system 200 may include base station (BS) 105-a and UE 115-a, which may be examples of the corresponding devices described with reference to FIG. 1. Wireless communications system 200 may support CSI reporting with CSI configurations that exclude an RI, where the CSI configuration may include a PMI, where the PMI may be based on the RI or a UE category. In some instances, a CSI configuration having only a PMI without an explicit RI may indicate an implicit RI of 1.

Wireless communications system 200 may support the use of multiple configurations such as SISO, MIMO, or other combinations of single or multiple inputs and outputs, as well as different beamforming configurations. The choice of transmission mode may be based on the capabilities of the devices (e.g., on a user equipment (UE) category), or on channel conditions. Different transmission modes may be associated with different control signals and reference signals. For example, different transmission modes may utilize different channel state information (CSI) reporting configurations. Also, some transmission modes may be demodulated based on cell-specific reference signals (CRS) and others may be based on demodulation reference signals (DMRS).

Thus, base station 105-a may communicate with different UEs 115 using different transmission modes. For example, base station 105-a may support the operation of enhanced eMTC devices such as UE 115-b, which may be limited to support rank 1 (single layer) communications due to low cost design and reduced complexity (e.g., eMTC UEs 115-b may have a single antenna). For a UE 115 with a single antenna (and hence, continuously using rank 1), transmitting or calculating RI may result in excess signaling overhead and increased power consumption.

In some cases, wireless devices may use RI feedback in a CSI report to determine how many communication layers will be used. For example, an RI may be based on the number of antennas used by a UE, such as UE 115-a and UE 115-b, and may provide a base station 105-a with an indication of the channel conditions or a UE's capabilities. However, in some cases, the RI may be determined implicitly. This may allow base station 105-a to communicate with the UE 115 more efficiently. For example, the UE 115 and base station 105-a may communicate using a reduced signaling overhead.

A UE 115 may be configured to report both PMI and RI and may not report these indications separately. That is, in some cases, each CSI report or series of reports may contain both PMI information and RI information, while in other cases, PMI may be reported separately and rank may be determined without explicit RI signaling. Communicating PMI without RI may be used for UEs 115 with a single antenna, such as UE 115-b, or for a UE 115 in poor channel conditions such as UE 115-a. For example, reporting PMI alone may be used for beamforming gain in wireless devices that have multiple antennas (e.g., a UE 115-a with eight transmission antennas may report PMI without a RI when the rank is set to 1).

UEs 115 may transmit RI either explicitly or implicitly based on the type of UE 115 or the capabilities of the UE 115. For example, an eMTC UE 115-b may not transmit RI as a result of having a single antenna as described above. Additionally or alternatively, a UE 115 may be configured (e.g., by RRC messaging) to transmit only PMI and not RI. In some cases, a UE may be configured with a default RI, and the PMI may be based on the default RI.

In some cases, the RI transmission may be enabled or disabled implicitly by setting a value of an RI index $I_{RI}$ that may take on a value between 0 and 1023, where $I_{RI}$ may be signaled by base station 105-a. The subframes used for repetition may be identified using the equation $$\left(10 \times n_f + \left\lfloor \frac{n_s}{2} \right\rfloor - N_{OFFSET,CQI} - N_{OFFSET,RI}\right) \bmod(H \cdot N_{pd} \cdot M_{RI}) = 0,$$

where, $n_f$ is a frame number, n is a slot number, $N_{OFFSET,CQI}$ and $N_{OFFSET,RI}$ are configuration variables based on an offset position (i.e., the subframe offset of the reporting cycle), H is a parameter based on the cycle number and a number of bandwidth parts, $N_{pd}$ is the periodicity of a CQI, and $M_{RI}$ is based on the configuration variable $I_{RI}$.

Examples of the different values for $I_{RI}$ and the relation to $M_{RI}$ are provided in Table 1. In some cases, there may be a specific value of $M_{RI}$ that prevents transmission of RI. For example, RI=1023 may indicate that $M_{RI}=\infty$, and an RI may not be transmitted.

TABLE 1

| Rank Indicator Index Look-Up-Table | | |
|---|---|---|
| $I_{RI}$ | Value of $M_{RI}$ | Value of $N_{OFFSET, RI}$ |
| $0 \leq I_{RI} \leq 160$ | 1 | $-I_{RI}$ |
| $161 \leq I_{RI} \leq 321$ | 2 | $-(I_{RI} - 161)$ |

TABLE 1-continued

Rank Indicator Index Look-Up-Table

| $I_{RI}$ | Value of $M_{RI}$ | Value of $N_{OFFSET, RI}$ |
|---|---|---|
| $322 \leq I_{RI} \leq 482$ | 4 | $-(I_{RI} - 322)$ |
| $483 \leq I_{RI} \leq 643$ | 8 | $-(I_{RI} - 483)$ |
| $644 \leq I_{RI} \leq 643$ | 16 | $-(I_{RI} - 644)$ |
| $805 \leq I_{RI} \leq 804$ | 32 | $-(I_{RI} - 805)$ |
| $966 \leq I_{RI} \leq 1023$ | | Reserved |

In some cases, a UE 115 configured not to transmit RI may calculate CSI based on an estimation of a channel matrix. For example, in a feedback operation that prevents transmission of RI, the UE 115 may estimate the whole channel matrix, assume a given RI (based on the UE 115 configuration), select the PMI assuming RI=1, and compute the corresponding CQI.

In some cases, a UE 115 may transmit feedback on PUCCH when the UE 115 is configured with periodic feedback, and the feedback transmission may change based on different situations. For example, if the UE 115 is to transmit PMI/CQI/RI in the PUCCH, it may only transmit PMI and CQI. Alternately, if the UE 115 is to transmit only RI in the PUCCH, it may refrain from transmitting PUCCH.

In some cases, a UE 115 may transmit RI in the PUSCH when a periodic CSI collides with a PUSCH transmission or when an aperiodic CSI is triggered from downlink control information. In some examples, if the UE 115 transmits RI over PUSCH, then the RI symbols may puncture the PUSCH transmission. In other examples, the UE 115 may not transmit RI over the PUSCH and instead may transmit PMI over the PUSCH assuming the configured PMI. In some cases, a UE 115 may perform the PMI/CQI/RI calculation based on CSI-RS. For example, for eMTC UEs 115-b PMI/CQI may be estimated based on CRS. That is, the reference signal used for RI feedback may depend on the capabilities of the UE 115.

Figure 3:
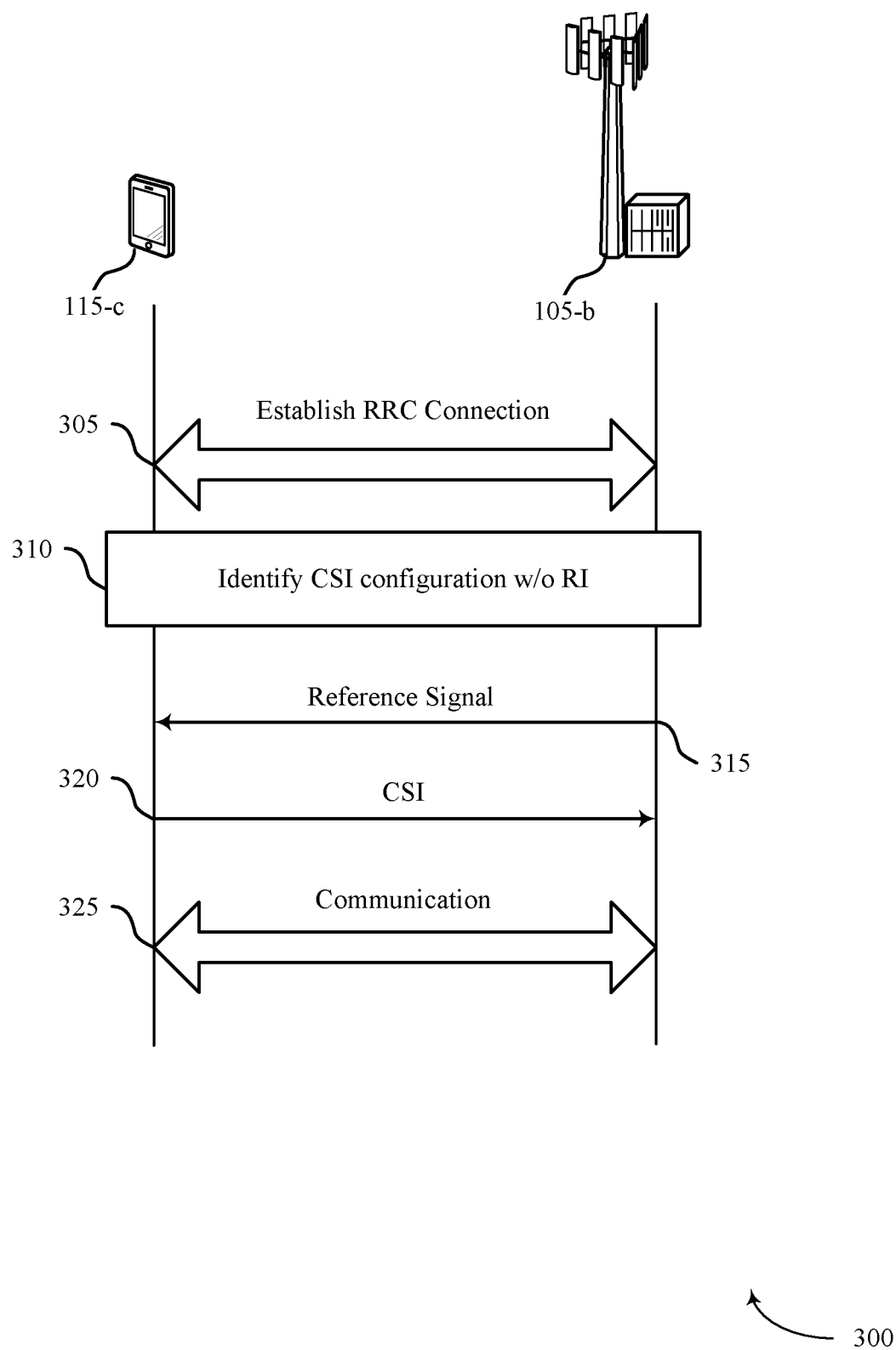
FIG. 3 illustrates an example of a process flow in a system that supports CSI reporting for enhanced MTC in accordance with aspects of the present disclosure.

FIG. 3 illustrates an example of a process flow 300 for a system that supports CSI reporting for enhanced MTC in accordance with various aspects of the present disclosure. Process flow 300 may include BS 105-a and UE 115-a, which may be examples of the corresponding devices described with reference to FIG. 1-2.

At step 305, UE 115-c and base station 105-b may establish an RRC connection. At step 310, UE 115-c and base station 105-b may identify a transmission mode that specifies an RI feedback parameter for CSI reporting and determine that a CSI configuration excludes an RI. In some cases, UE 115-c or base station 105-b may identify a UE category, where the determination that the CSI configuration excludes the RI is based at least in part on the UE category.

UE 115-c may transmit and base station 105-b may receive the indication of the UE category, where the indication of the UE category is indicative of a rank. In some cases, base station 105-b may transmit and UE 115-c may receive RRC signaling that indicates the CSI configuration. In some examples, UE 115-c may determine that a channel condition parameter is below a threshold, and the determination that the CSI configuration excludes the RI is based on the determination that the channel condition parameter is below the threshold.

In some examples, a UE 115-c may identify an RI index and the determination that the CSI configuration excludes the RI is based on the RI index. The CSI configuration may include a periodic reporting configuration. In some cases, the CSI configuration includes an aperiodic reporting configuration associated with a downlink control information format of the transmission mode.

A UE 115-c or base station 105-b may estimate a matrix representative of a channel for the communicating, select a PMI based on a default RI, and determine a CQI that corresponds to the PMI. In some cases, UE 115-c or base station 105-b may identify a reference signal type to use for channel estimation based on a category of a UE 115-c and determine at least one of a PMI or a CQI using a reference signal of the identified reference signal type, where the identified reference signal type includes a CRS.

At step 315, base station 105-b may transmit one or more reference signals to UE 115-c. At step 320, UE 115-c may transmit and base station 105-b may receive a CSI report based on the CSI configuration and the reference signals. In some cases, the CSI report includes a PMI, where the PMI is based on the RI. In some examples, the CSI report includes a PMI, and the PMI may be based on a rank. In some examples, receiving a CSI report may be based on the CSI configuration.

At step 325, UE 115-c and base station 105-b may communicate using the transmission mode according to the CSI configuration. In some cases, the communication includes base station 105-b transmitting and UE 115-c receiving downlink signaling based on the CSI report. In some cases the communication includes the base station 105-b transmitting downlink signaling based on the CSI report. The communication may include UE 115-c transmitting and base station 105-b receiving a PMI according to the CSI configuration, and the PMI may be associated with a default RI configured by the RRC signaling.

In some examples, when the CSI configuration includes a periodic reporting configuration, the communication includes transmitting by the UE 115-c at least one of a PMI, an RI, or a CQI using a control channel if the PMI, RI or CQI are available for transmission and refraining from transmitting the control channel if the PMI, RI or CQI are unavailable for transmission. In some examples, when the CSI configuration includes a periodic reporting configuration, the communication may include identifying a collision between a CSI report and an uplink transmission scheduled for a shared channel and transmit a PMI using the shared channel. In some cases, when the CSI configuration includes an aperiodic reporting configuration associated with a downlink control information format of the transmission mode, the communication may include transmitting a PMI using a shared channel.

Figure 4:
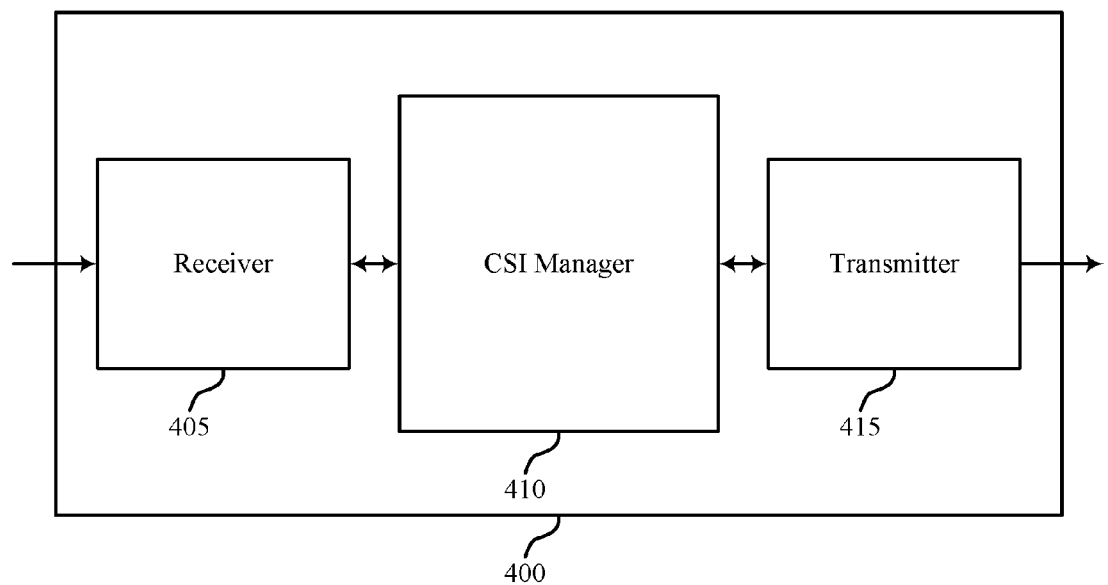
FIGS. 4 through 6 show block diagrams of a wireless device that supports CSI reporting for enhanced MTC in accordance with aspects of the present disclosure.

FIG. 4 shows a block diagram of a wireless device 400 that supports modified CSI reporting for enhanced MTC in accordance with various aspects of the present disclosure. Wireless device 400 may be an example of aspects of a UE 115 or base station 105 described with reference to FIGS. 1 and 2. Wireless device 400 may include receiver 405, CSI manager 410 and transmitter 415. Wireless device 400 may also include a processor. Each of these components may be in communication with each other.

The receiver 405 may receive information such as packets, user data, or control information associated with various information channels (e.g., control channels, data channels, and information related to modified CSI reporting for enhanced MTC, etc.). Information may be passed on to other components of the device. The receiver 405 may be an example of aspects of the transceiver 725 described with reference to FIG. 7.

The CSI manager 410 may identify a transmission mode that specifies an RI feedback parameter for CSI reporting, determine that a CSI configuration excludes an RI, and communicate using the transmission mode according to the CSI configuration. The CSI manager 410 may also be an example of aspects of the CSI manager 705 described with reference to FIG. 7. The CSI manager 410 may also be an example of and/or related to software, hardware, a circuit or circuitry, a processor, another structural element, or some combination thereof in accordance with various aspects of the present disclosure.

The transmitter 415 may transmit signals received from other components of wireless device 400. In some examples, the transmitter 415 may be collocated with a receiver in a transceiver module. For example, the transmitter 415 may be an example of aspects of the transceiver 725 described with reference to FIG. 7. The transmitter 415 may include a single antenna, or it may include a plurality of antennas.

Figure 5:
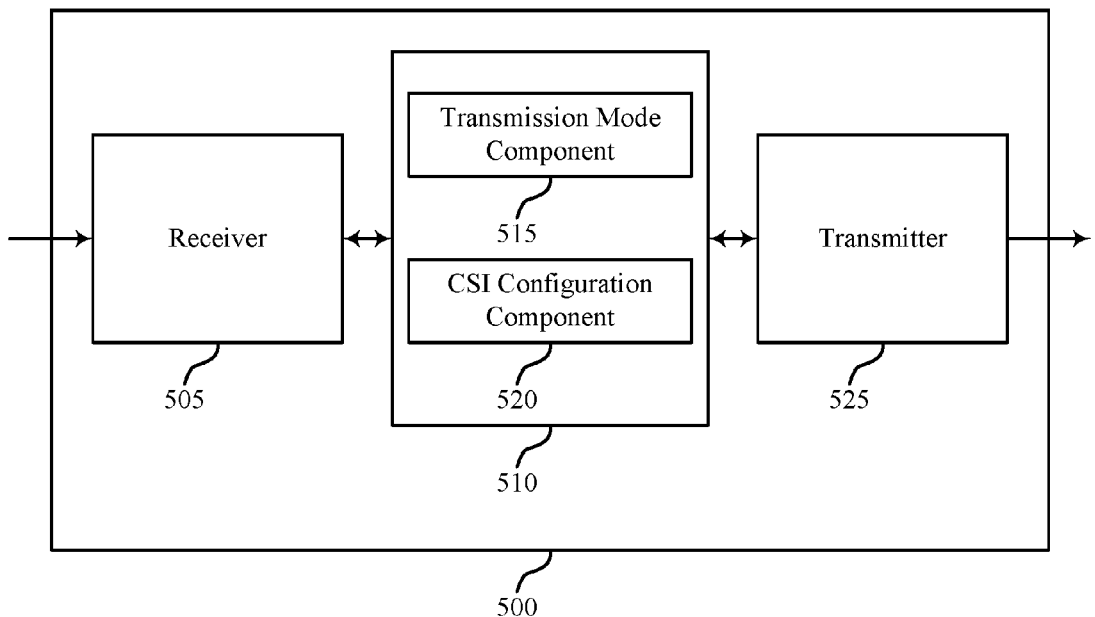

FIG. 5 shows a block diagram of a wireless device 500 that supports modified CSI reporting for enhanced MTC in accordance with various aspects of the present disclosure. Wireless device 500 may be an example of aspects of a wireless device 400 or a UE 115 or base station 105 described with reference to FIGS. 1, 2 and 4. Wireless device 500 may include receiver 505, CSI manager 510 and transmitter 525. Wireless device 500 may also include a processor. Each of these components may be in communication with each other.

The receiver 505 may receive information which may be passed on to other components of the device. The receiver 505 may also perform the functions described with reference to the receiver 405 of FIG. 4. The receiver 505 may be an example of aspects of the transceiver 725 described with reference to FIG. 7.

The CSI manager 510 may be an example of aspects of CSI manager 410 described with reference to FIG. 4. The CSI manager 510 may include transmission mode component 515 and CSI configuration component 520. The CSI manager 510 may be an example of aspects of the CSI manager 705 described with reference to FIG. 7.

The transmission mode component 515 may identify a transmission mode that specifies an RI feedback parameter for CSI reporting, and communicate using the transmission mode according to the CSI configuration.

The CSI configuration component 520 may determine that a CSI configuration excludes an RI. In some cases, the CSI configuration includes a periodic reporting configuration and the communicating includes transmitting at least one of a PMI, RI or a CQI using a control channel if the PMI, RI or CQI are available for transmission and refraining from transmitting the control channel if the PMI, RI, or CQI are unavailable for transmission.

In some cases, the CSI configuration includes a periodic reporting configuration and the communicating includes identifying a collision between a CSI report and an uplink transmission scheduled for a shared channel. In some cases, the CSI configuration includes an aperiodic reporting configuration associated with a downlink control information format of the transmission mode and the communicating includes transmitting a PMI using a shared channel.

The transmitter 525 may transmit signals received from other components of wireless device 500. In some examples, the transmitter 525 may be collocated with a receiver in a transceiver module. For example, the transmitter 525 may be an example of aspects of the transceiver 725 described with reference to FIG. 7. The transmitter 525 may utilize a single antenna, or it may utilize a plurality of antennas.

Figure 6:
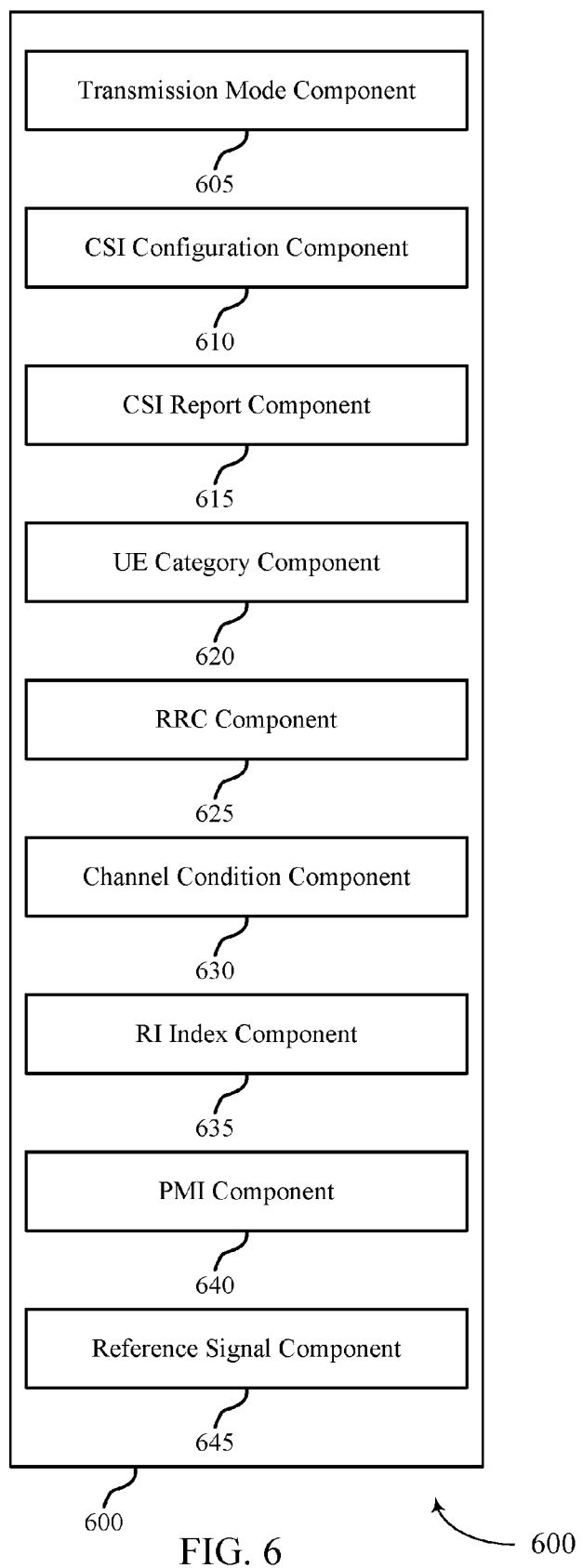

FIG. 6 shows a block diagram of a CSI manager 600 which may be an example of the corresponding component of wireless device 400 or wireless device 500. That is, CSI manager 600 may be an example of aspects of CSI manager 410 or CSI manager 510 described with reference to FIGS. 4 and 5. The CSI manager 600 may also be an example of aspects of the CSI manager 705 described with reference to FIG. 7.

The CSI manager 600 may include transmission mode component 605, CSI configuration component 610, CSI report component 615, UE category component 620, RRC component 625, channel condition component 630, RI index component 635, PMI component 640 and reference signal component 645. Each of these modules may communicate, directly or indirectly, with one another (e.g., via one or more buses).

The transmission mode component 605 may identify a transmission mode that specifies an RI feedback parameter for CSI reporting, and communicate using the transmission mode according to the CSI configuration.

The CSI configuration component 610 may determine that a CSI configuration excludes an RI. In some cases, the CSI configuration includes a periodic reporting configuration and the communicating includes transmitting at least one of a PMI, RI or a CQI using a control channel if the PMI, RI or CQI are available for transmission and refraining from transmitting the control channel if the PMI, RI, or CQI are unavailable for transmission.

In some cases, the CSI configuration includes a periodic reporting configuration and the communicating includes identifying a collision between a CSI report and an uplink transmission scheduled for a shared channel. In some cases, the CSI configuration includes an aperiodic reporting configuration associated with a downlink control information format of the transmission mode and the communicating includes transmitting a PMI using a shared channel.

The CSI report component 615 in combination with a receiver 405 or 505 or transmitter 415 or 525, may receive a CSI report based on the CSI configuration, and the communicating may include transmitting downlink signaling based on the CSI report, and transmit a CSI report based on the CSI configuration, and the communicating may include receiving downlink signaling based on the CSI report.

In some cases, the CSI report includes a PMI; the PMI may be based on the RI. In some cases, the CSI report includes a PMI; the PMI may be based on a rank. In some cases, receiving a CSI report may be based on the CSI configuration.

The UE category component 620 may identify a user equipment category, and the determination that the CSI configuration excludes the RI may be based on the user equipment category. The UE category component 620 may also transmit an indication of the user equipment category, and the indication of the UE category may be indicative of a rank, and it may receive an indication of the user equipment category; the indication of user equipment category may be indicative of a rank.

The RRC component 625 may receive radio resource control signaling that indicates the CSI configuration, and transmit radio resource control signaling that indicates the CSI configuration.

The channel condition component 630 may determine that a channel condition parameter is below a threshold, and the determination that the CSI configuration excludes the RI may be based on the determination that the channel condition parameter is below the threshold.

The RI index component 635 may identify an RI index, the determination that the CSI configuration excludes the RI may be based on the RI index.

The PMI component 640 may estimate a matrix representative of a channel for the communicating, select a PMI based on a default RI, determine a CQI that corresponds to the PMI; the communicating may include transmitting the CQI and the PMI, and transmit a PMI using the shared channel. In some cases, the communicating includes transmitting a PMI according to the CSI configuration, and the PMI may be associated with a default RI configured by the RRC signaling. In some cases, the communicating includes receiving a PMI according to the CSI configuration, and the PMI may be associated with a default RI configured by the RRC signaling.

The reference signal component 645 may identify a reference signal type to use for channel estimation based on a category of a user equipment, and determine at least one of a PMI or a CQI using a reference signal of the identified reference signal type, the communicating may include transmitting the PMI or the CQI. In some cases, the identified reference signal type includes a cell-specific reference signal.

Figure 7:
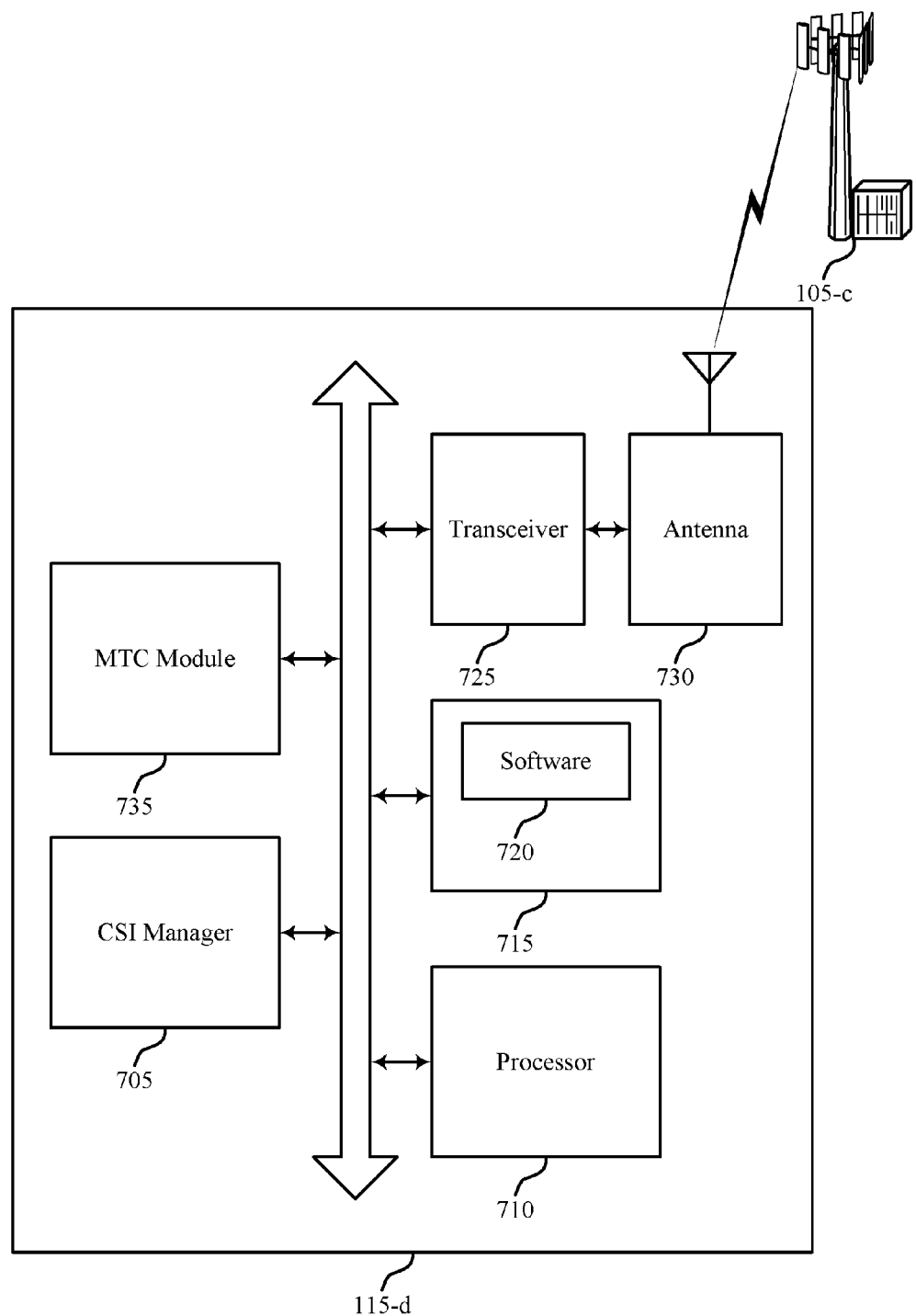
FIG. 7 illustrates a block diagram of a system including a UE that supports CSI reporting for enhanced MTC in accordance with aspects of the present disclosure.

FIG. 7 shows a diagram of a system 700 including a device that supports modified CSI reporting for enhanced MTC in accordance with various aspects of the present disclosure. For example, system 700 may include UE 115-*d*, which may be an example of a wireless device 400, a wireless device 500, or a UE 115 as described with reference to FIGS. 1, 2 and 4 through 6.

UE 115-*d* may also include CSI manager 705, processor 710, memory 715, transceiver 725, antenna 730 and MTC module 735. Each of these modules may communicate, directly or indirectly, with one another (e.g., via one or more buses). The CSI manager 705 may be an example of a CSI manager as described with reference to FIGS. 4 through 6. The processor 710 may include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, processor 710 may be configured to operate a memory array using a memory controller. In other cases, a memory controller may be integrated into processor 710. Processor 710 may be configured to execute computer-readable instructions stored in a memory to perform various functions (e.g., functions or tasks supporting CSI reporting for enhanced MTC).

The memory 715 may include random access memory (RAM) and read only memory (ROM). The memory 715 may store computer-readable, computer-executable software including instructions that, when executed, cause the processor to perform various functions described herein (e.g., modified CSI reporting for enhanced MTC, etc.). In some cases, the software 720 may not be directly executable by the processor but may cause a computer (e.g., when compiled and executed) to perform functions described herein.

The transceiver 725 may communicate bi-directionally, via one or more antennas, wired, or wireless links, with one or more networks, as described above. For example, the transceiver 725 may communicate bi-directionally with a base station 105 or a UE 115. The transceiver 725 may also include a modem to modulate the packets and provide the modulated packets to the antennas for transmission, and to demodulate packets received from the antennas. In some cases, the wireless device may include a single antenna 730. However, in some cases the device may have more than one antenna 730, which may be capable of concurrently transmitting or receiving multiple wireless transmissions.

The MTC module 735 may enable MTC or eMTC operations as described above with reference to FIG. 1. For example, MTC module 735 may enable narrowband communications, communication using a single antenna, or communication based on reduced control signaling.

Figure 8:
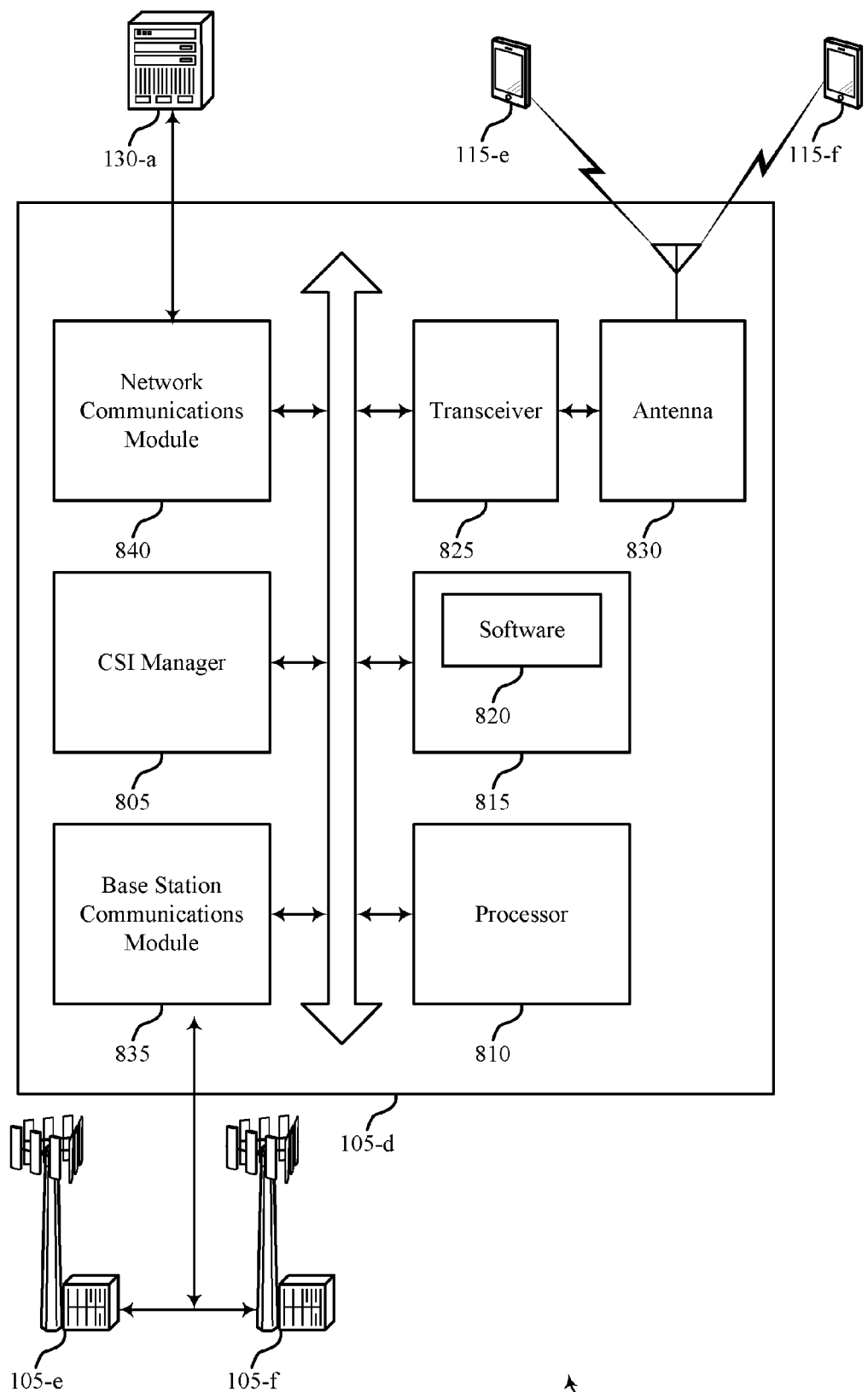
FIG. 8 illustrates a block diagram of a system including a base station that supports CSI reporting for enhanced MTC in accordance with aspects of the present disclosure.

FIG. 8 shows a diagram of a wireless system 800 including a device configured that supports modified CSI reporting for enhanced MTC in accordance with various aspects of the present disclosure. For example, wireless system 800 may include base station 105-*d*, which may be an example of a wireless device 400, a wireless device 500, or a base station 105 as described with reference to FIGS. 1, 2 and 4 through 6. Base station 105-*d* may also include components for bi-directional voice and data communications including components for transmitting communications and components for receiving communications. For example, base station 105-*d* may communicate bi-directionally with one or more UEs 115.

Base station 105-*d* may also include CSI manager 805, processor 810, memory 815, transceiver 825, antenna 830, base station communications module 835 and network communications module 840. Each of these modules may communicate, directly or indirectly, with one another (e.g., via one or more buses).

The CSI manager 805 may be an example of a CSI manager as described with reference to FIGS. 4 through 6. The processor 810 may include an intelligent hardware device, (e.g., a CPU, a microcontroller, an ASIC, etc.). The memory 815 may include RAM and ROM. The memory 815 may store computer-readable, computer-executable software including instructions that, when executed, cause the processor to perform various functions described herein (e.g., modified CSI reporting for enhanced MTC, etc.). In some cases, the software 820 may not be directly executable by the processor but may cause a computer (e.g., when compiled and executed) to perform functions described herein.

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 730, which may be capable of concurrently transmitting or receiving multiple wireless transmissions.

The base station communications module 835 may manage communications with other base station 105, and may include a controller or scheduler for controlling communications with UEs 115 in cooperation with other base stations 105. For example, the base station communications module 835 may coordinate scheduling for transmissions to UEs 115 for various interference mitigation techniques such as beamforming or joint transmission. In some examples, base station communications module 835 may provide an X2 interface within an LTE/LTE-A wireless communication network technology to provide communication between base stations 105.

The network communications module 840 may manage communications with the core network (e.g., via one or more wired backhaul links). For example, the network communications module 840 may manage the transfer of data communications for client devices, such as one or more UEs 115.

Figure 9:
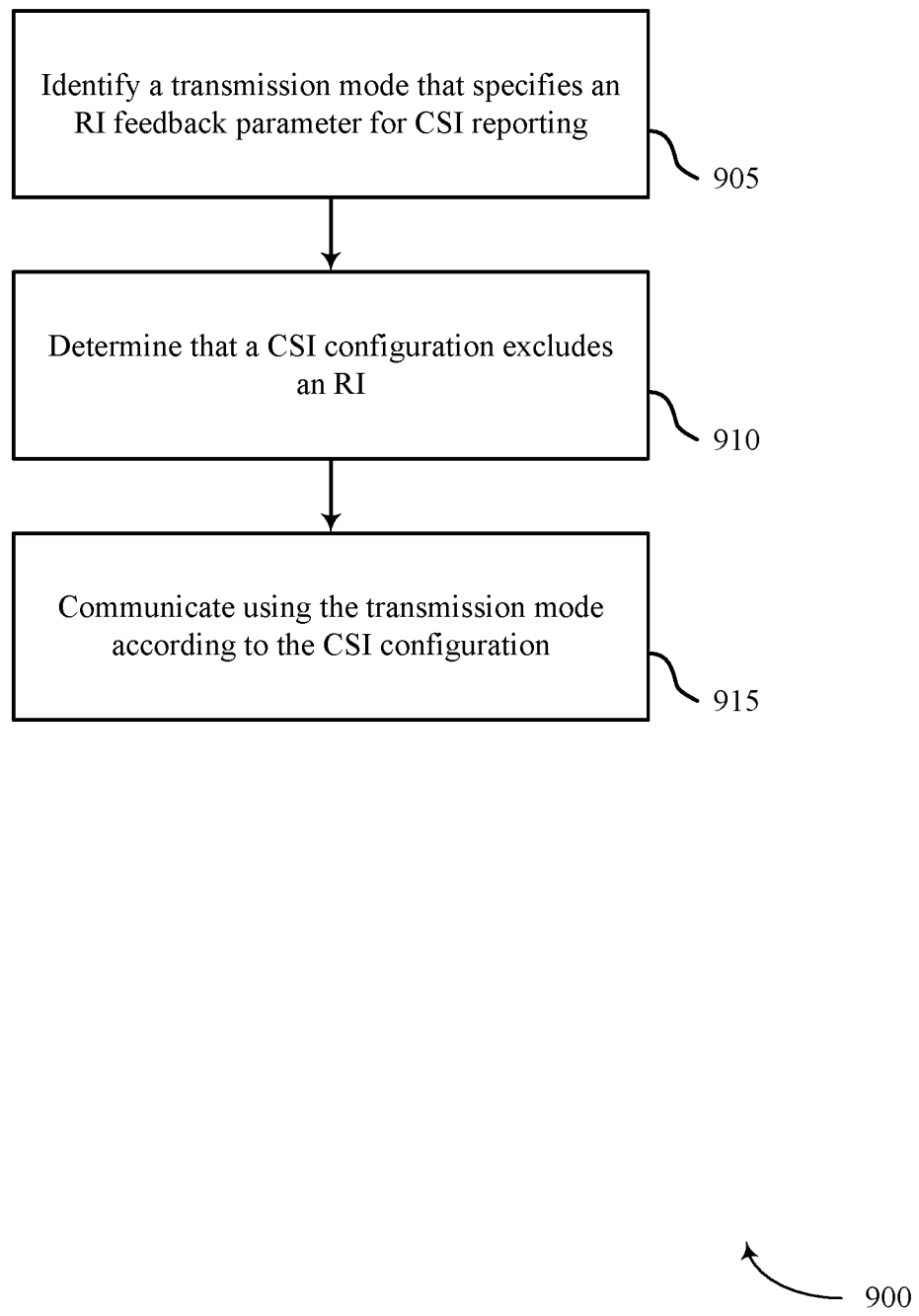
FIGS. 9 through 16 illustrate methods for CSI reporting for enhanced MTC in accordance with aspects of the present disclosure.

FIG. 9 shows a flowchart illustrating a method 900 for modified CSI reporting for enhanced MTC in accordance with various aspects of the present disclosure. The operations of method 900 may be implemented by a UE 115 or base station 105 or its components as described with reference to FIGS. 1 and 2. For example, the operations of method 900 may be performed by the CSI manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 905, the UE 115 or base station 105 may identify a transmission mode that specifies an RI feedback parameter for CSI reporting as described above with reference to FIGS. 2 through 3. In certain examples, the operations of block 905 may be performed by the transmission mode component as described with reference to FIG. 5.

At block 910, the UE 115 or base station 105 may determine that a CSI configuration excludes an RI as described above with reference to FIGS. 2 through 3. In certain examples, the operations of block 910 may be performed by the CSI configuration component as described with reference to FIG. 5.

At block 915, the UE 115 or base station 105 may communicate using the transmission mode according to the CSI configuration as described above with reference to FIGS. 2 through 3. In certain examples, the operations of block 915 may be performed by the transmission mode component as described with reference to FIG. 5.

Figure 10:
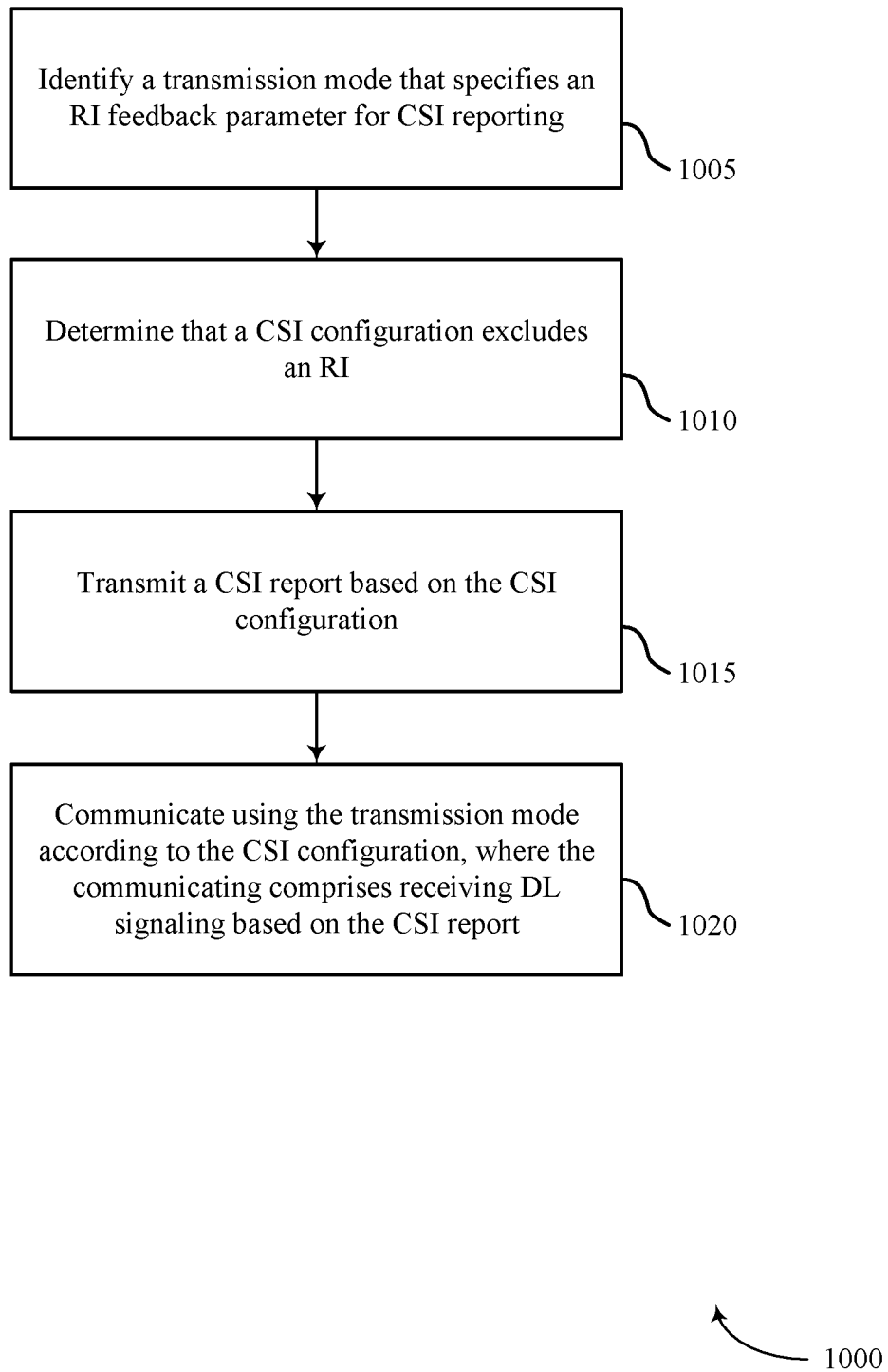

FIG. 10 shows a flowchart illustrating a method 1000 for modified CSI reporting for enhanced MTC in accordance with various aspects of the present disclosure. The operations of method 1000 may be implemented by a UE 115 or its components as described with reference to FIGS. 1 and 2. For example, the operations of method 1000 may be performed by the CSI manager as described herein. In some examples, the UE 115 may execute a set of codes to control the functional elements of the device to perform the functions described below. Additionally or alternatively, the UE 115 may perform aspects of the functions described below using special-purpose hardware.

At block 1005, the UE 115 may identify a transmission mode that specifies an RI feedback parameter for CSI reporting as described above with reference to FIGS. 2 through 3. In certain examples, the operations of block 1005 may be performed by the transmission mode component as described with reference to FIG. 5.

At block 1010, the UE 115 may determine that a CSI configuration excludes an RI as described above with reference to FIGS. 2 through 3. In certain examples, the operations of block 1010 may be performed by the CSI configuration component as described with reference to FIG. 5.

At block 1015, the UE 115 may transmit a CSI report based on the CSI configuration, where the communicating includes receiving DL signaling based on the CSI report as described above with reference to FIGS. 2 through 3. In certain examples, the operations of block 1015 may be performed by the CSI report component as described with reference to FIG. 5.

At block 1020, the UE 115 may communicate using the transmission mode according to the CSI configuration as described above with reference to FIGS. 2 through 3. In certain examples, the operations of block 1020 may be performed by the transmission mode component as described with reference to FIG. 5.

Figure 11:
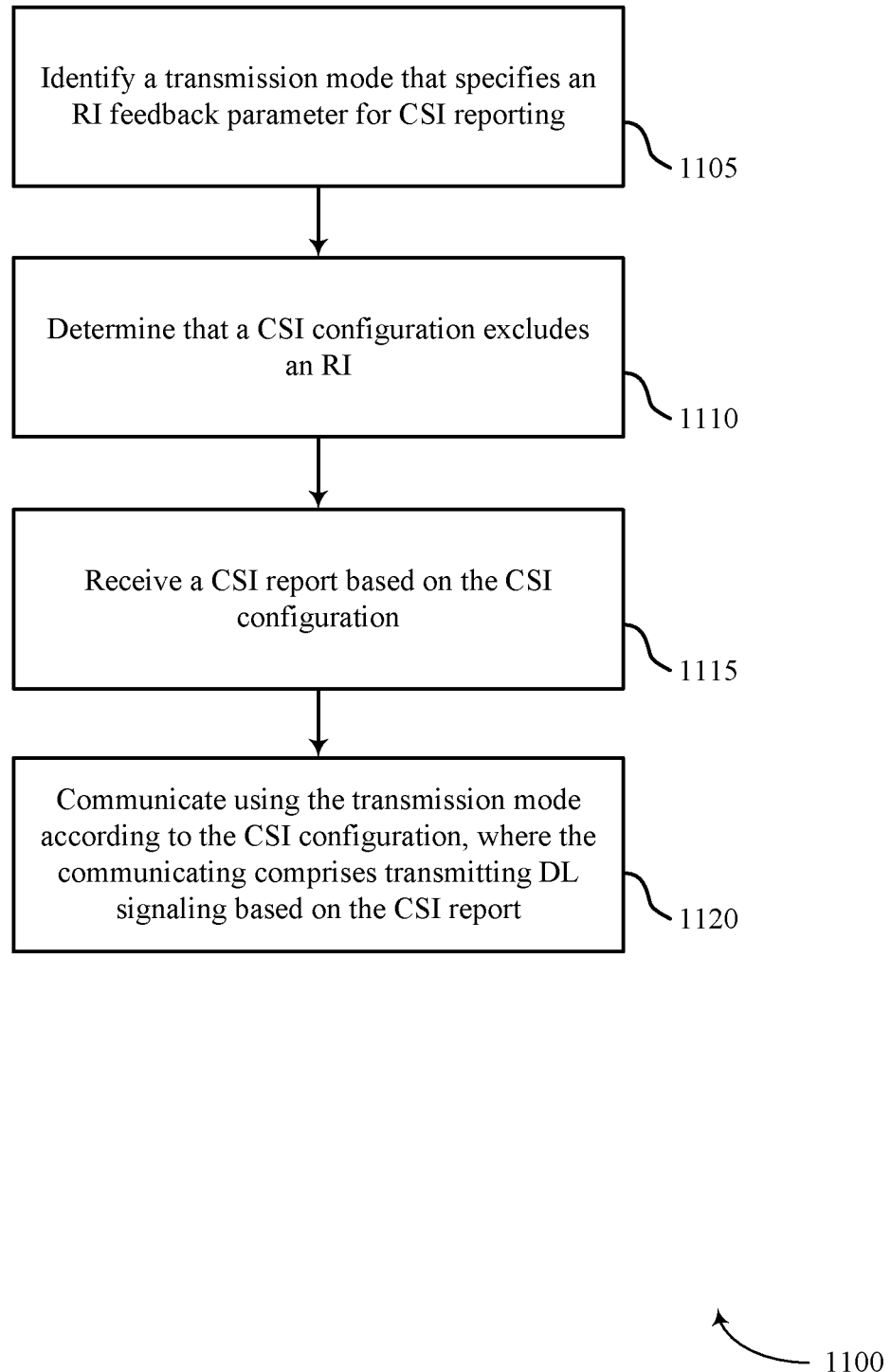

FIG. 11 shows a flowchart illustrating a method 1100 for modified CSI reporting for enhanced MTC in accordance with various aspects of the present disclosure. The operations of method 1100 may be implemented by a base station 105 or its components as described with reference to FIGS. 1 and 2. For example, the operations of method 1100 may be performed by the CSI manager as described herein. In some examples, the base station 105 may execute a set of codes to control the functional elements of the device to perform the functions described below. Additionally or alternatively, the base station 105 may perform aspects of the functions described below using special-purpose hardware.

At block 1105, the base station 105 may identify a transmission mode that specifies an RI feedback parameter for CSI reporting as described above with reference to FIGS. 2 through 3. In certain examples, the operations of block 1105 may be performed by the transmission mode component as described with reference to FIG. 5.

At block 1110, the base station 105 may determine that a CSI configuration excludes an RI as described above with reference to FIGS. 2 through 3. In certain examples, the operations of block 1110 may be performed by the CSI configuration component as described with reference to FIG. 5.

At block 1115, the base station 105 may receive a CSI report based on the CSI configuration, where the communicating includes transmitting DL signaling based on the CSI report as described above with reference to FIGS. 2 through 3. In certain examples, the operations of block 1115 may be performed by the CSI report component as described with reference to FIG. 5.

At block 1120, the base station 105 may communicate using the transmission mode according to the CSI configuration as described above with reference to FIGS. 2 through 3. In certain examples, the operations of block 1120 may be performed by the transmission mode component as described with reference to FIG. 5.

Figure 12:
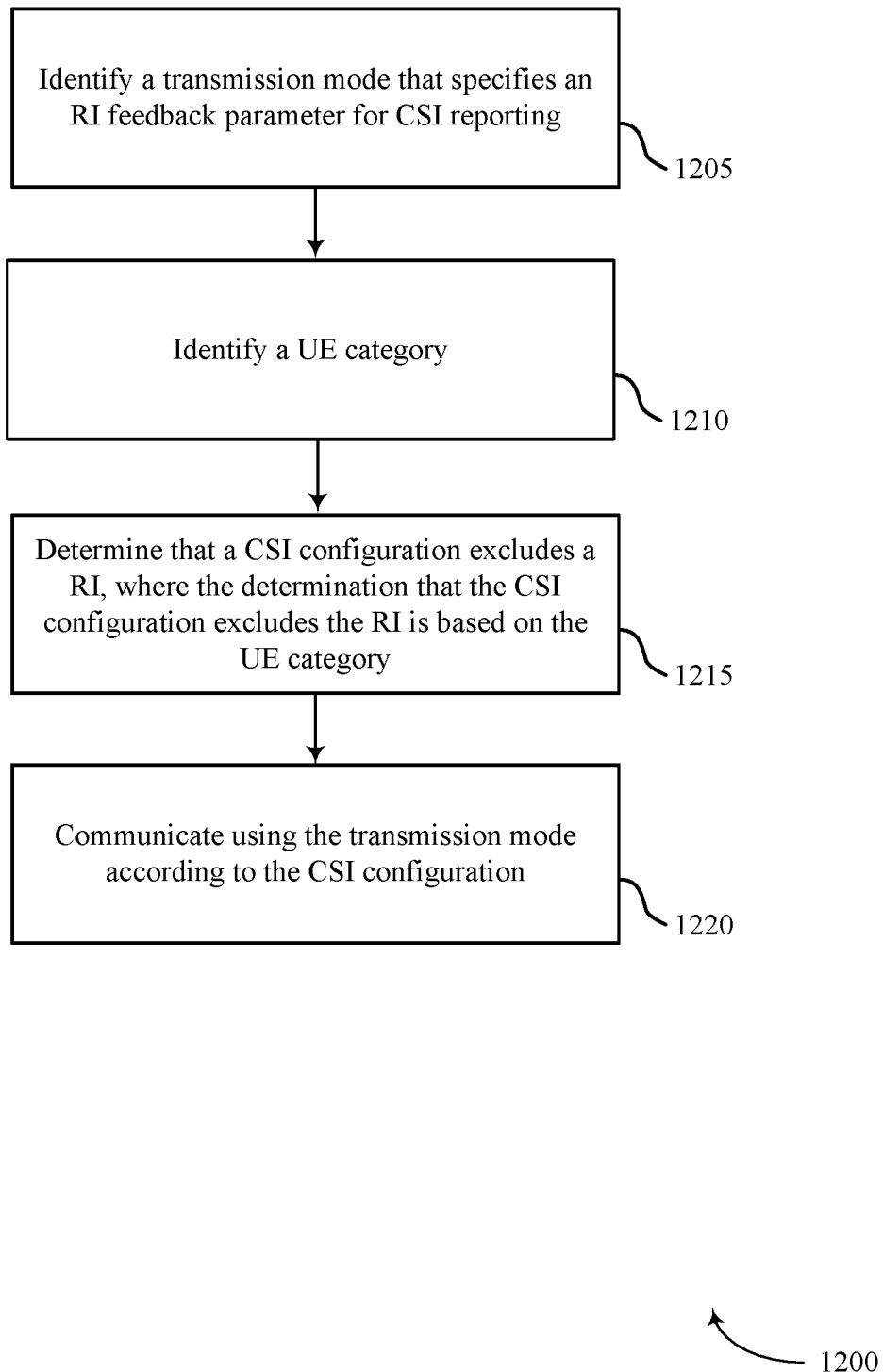

FIG. 12 shows a flowchart illustrating a method 1200 for modified CSI reporting for enhanced MTC in accordance with various aspects of the present disclosure. The operations of method 1200 may be implemented by a UE 115 or base station 105 or its components as described with reference to FIGS. 1 and 2. For example, the operations of method 1200 may be performed by the CSI manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1205, the UE 115 or base station 105 may identify a transmission mode that specifies an RI feedback parameter for CSI reporting as described above with reference to FIGS. 2 through 3. In certain examples, the operations of block 1205 may be performed by the transmission mode component as described with reference to FIG. 5.

At block 1210, the UE 115 or base station 105 may identify a UE category as described above with reference to FIGS. 2 through 3. In certain examples, the operations of block 1210 may be performed by the UE category component as described with reference to FIG. 5.

At block 1215, the UE 115 or base station 105 may determine that a CSI configuration excludes an RI, where the determination that the CSI configuration excludes the RI is based at least in part on the UE category as described above with reference to FIGS. 2 through 3. In certain examples, the operations of block 1215 may be performed by the CSI configuration component as described with reference to FIG. 5.

At block 1220, the UE 115 or base station 105 may communicate using the transmission mode according to the CSI configuration as described above with reference to FIGS. 2 through 3. In certain examples, the operations of block 1220 may be performed by the transmission mode component as described with reference to FIG. 5.

Figure 13:
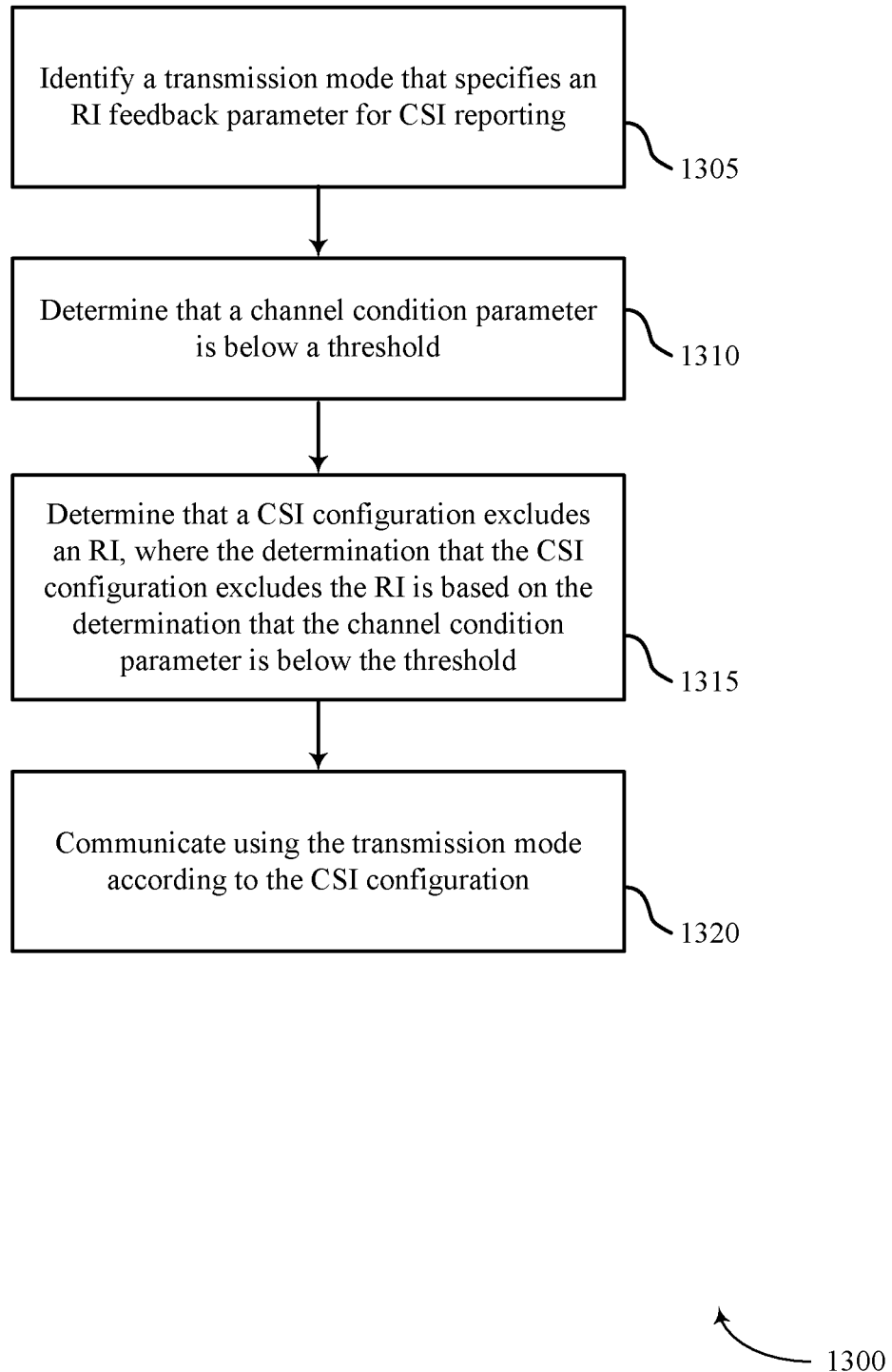

FIG. 13 shows a flowchart illustrating a method 1300 for modified CSI reporting for enhanced MTC in accordance with various aspects of the present disclosure. The operations of method 1300 may be implemented by a UE 115 or base station 105 or its components as described with reference to FIGS. 1 and 2. For example, the operations of method 1300 may be performed by the CSI manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1305, the UE 115 or base station 105 may identify a transmission mode that specifies an RI feedback parameter for CSI reporting as described above with reference to FIGS. 2 through 3. In certain examples, the operations of block 1305 may be performed by the transmission mode component as described with reference to FIG. 5.

At block 1310, the UE 115 or base station 105 may determine that a channel condition parameter is below a threshold as described above with reference to FIGS. 2 through 3. In certain examples, the operations of block 1310 may be performed by the channel condition component as described with reference to FIG. 5.

At block 1315, the UE 115 or base station 105 may determine that a CSI configuration excludes an RI, where the determination that the CSI configuration excludes the RI is based on the determination that the channel condition parameter is below the threshold as described above with reference to FIGS. 2 through 3. In certain examples, the operations of block 1315 may be performed by the CSI configuration component as described with reference to FIG. 5.

At block 1320, the UE 115 or base station 105 may communicate using the transmission mode according to the CSI configuration as described above with reference to FIGS. 2 through 3. In certain examples, the operations of block 1320 may be performed by the transmission mode component as described with reference to FIG. 5.

Figure 14:
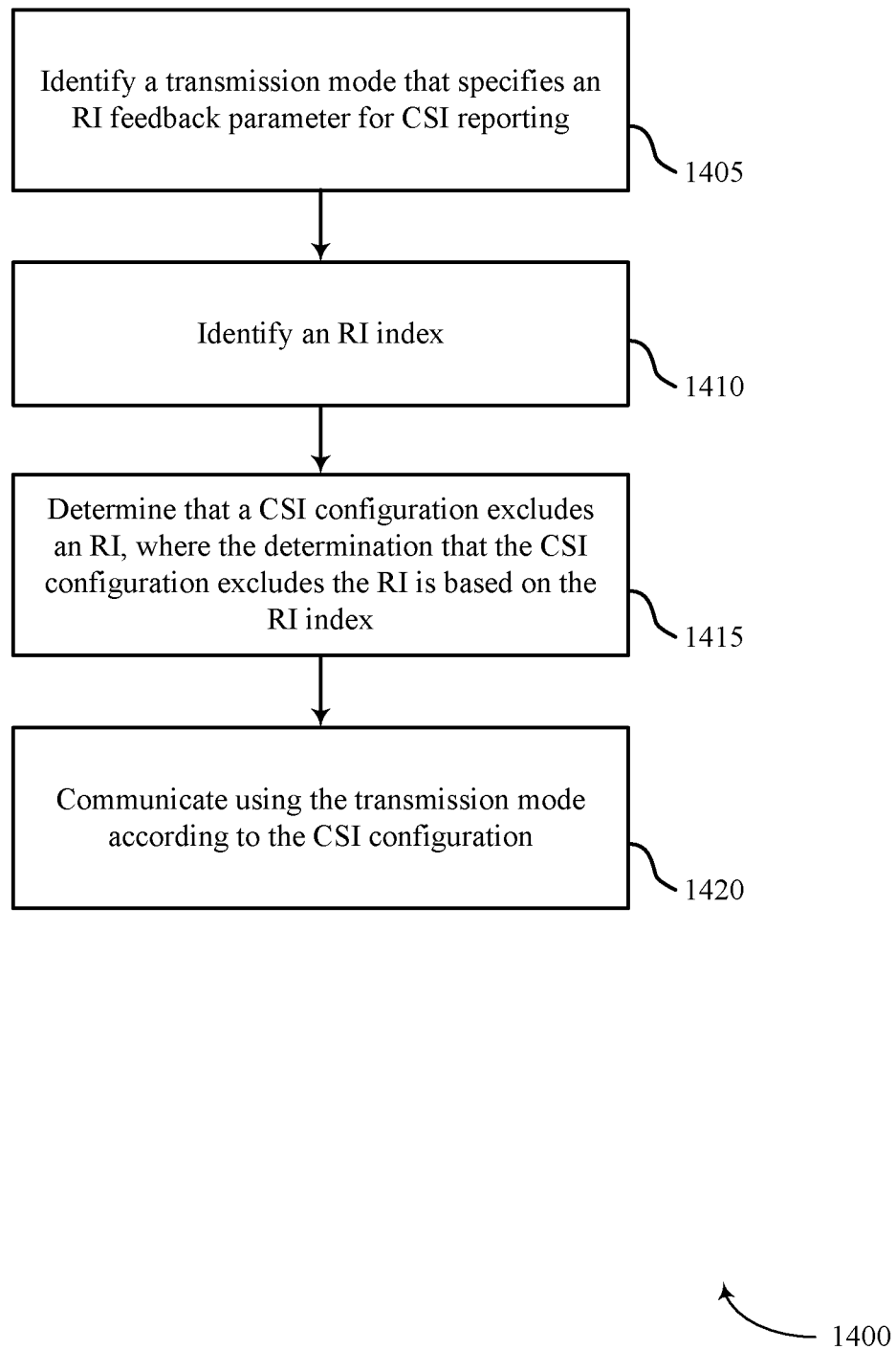

FIG. 14 shows a flowchart illustrating a method 1400 for modified CSI reporting for enhanced MTC in accordance with various aspects of the present disclosure. The operations of method 1400 may be implemented by a UE 115 or base station 105 or its components as described with reference to FIGS. 1 and 2. For example, the operations of method 1400 may be performed by the CSI manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1405, the UE 115 or base station 105 may identify a transmission mode that specifies an RI feedback parameter for CSI reporting as described above with reference to FIGS. 2 through 3. In certain examples, the operations of block 1405 may be performed by the transmission mode component as described with reference to FIG. 5.

At block 1410, the UE 115 or base station 105 may identify an RI index as described above with reference to FIGS. 2 through 3. In certain examples, the operations of block 1410 may be performed by the RI index component as described with reference to FIG. 5.

At block 1415, the UE 115 or base station 105 may determine that a CSI configuration excludes an RI, where the determination that the CSI configuration excludes the RI is based on the RI index as described above with reference to FIGS. 2 through 3. In certain examples, the operations of block 1415 may be performed by the CSI configuration component as described with reference to FIG. 5.

At block 1420, the UE 115 or base station 105 may communicate using the transmission mode according to the CSI configuration as described above with reference to FIGS. 2 through 3. In certain examples, the operations of block 1420 may be performed by the transmission mode component as described with reference to FIG. 5.

Figure 15:
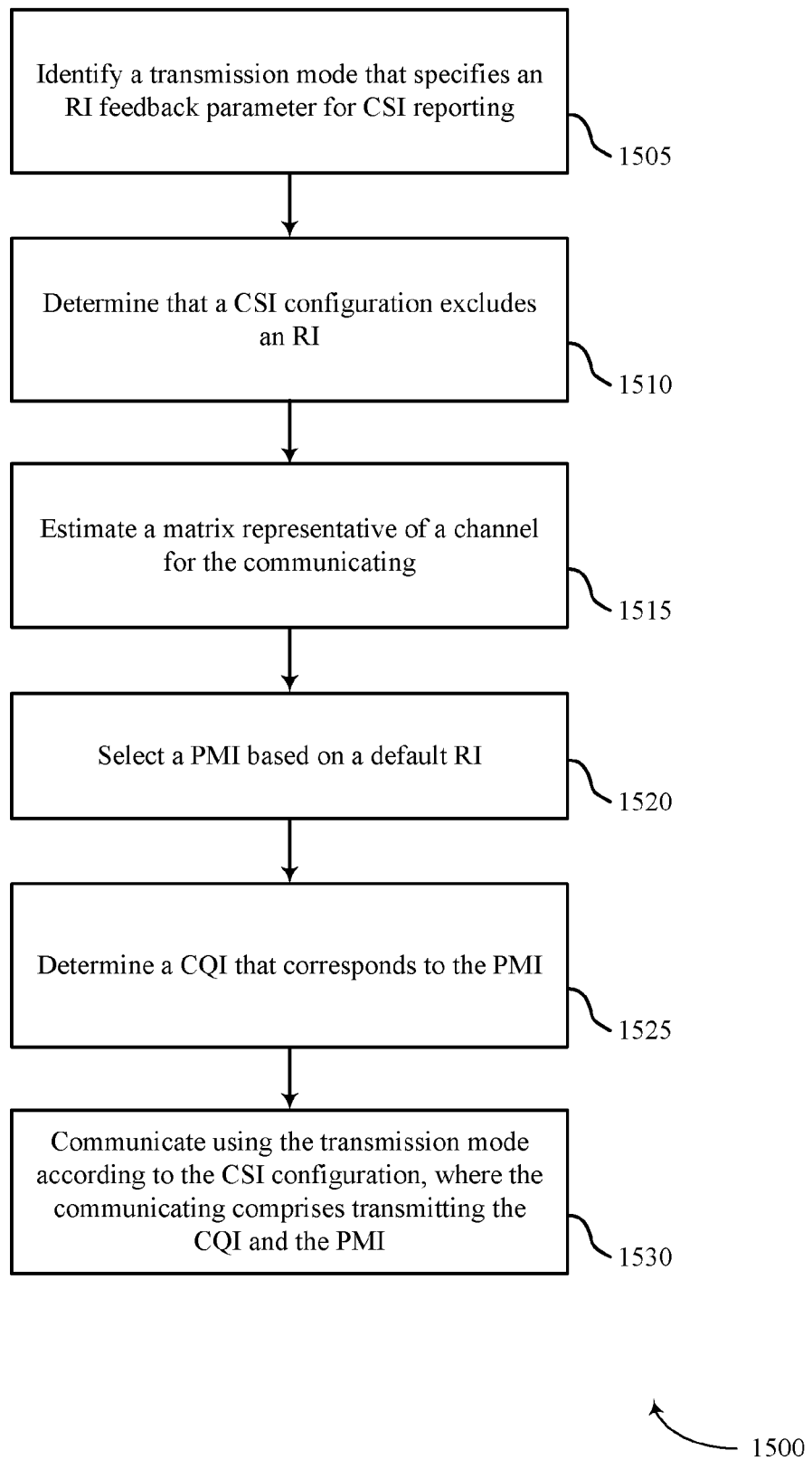

FIG. 15 shows a flowchart illustrating a method 1500 for modified CSI reporting for enhanced MTC in accordance with various aspects of the present disclosure. The operations of method 1500 may be implemented by a UE 115 its components as described with reference to FIGS. 1 and 2. For example, the operations of method 1500 may be performed by the CSI manager as described herein. In some examples, the UE 115 may execute a set of codes to control the functional elements of the device to perform the functions described below. Additionally or alternatively, the UE 115 may perform aspects of the functions described below using special-purpose hardware.

At block 1505, the UE 115 may identify a transmission mode that specifies an RI feedback parameter for CSI reporting as described above with reference to FIGS. 2 through 3. In certain examples, the operations of block 1505 may be performed by the transmission mode component as described with reference to FIG. 5.

At block 1510, the UE 115 may determine that a CSI configuration excludes an RI as described above with reference to FIGS. 2 through 3. In certain examples, the operations of block 1510 may be performed by the CSI configuration component as described with reference to FIG. 5.

At block 1515, the UE 115 may estimate a matrix representative of a channel for the communicating as described above with reference to FIGS. 2 through 3. In certain examples, the operations of block 1515 may be performed by the PMI component as described with reference to FIG. 5.

At block 1520, the UE 115 may select a PMI based on a default RI as described above with reference to FIGS. 2 through 3. In certain examples, the operations of block 1520 may be performed by the PMI component as described with reference to FIG. 5.

At block 1525, the UE 115 may determine a CQI that corresponds to the PMI, where the communicating includes transmitting the CQI and the PMI as described above with reference to FIGS. 2 through 3. In certain examples, the operations of block 1525 may be performed by the PMI component as described with reference to FIG. 5.

At block 1530, the UE 115 may communicate using the transmission mode according to the CSI configuration as described above with reference to FIGS. 2 through 3. In certain examples, the operations of block 1530 may be performed by the transmission mode component as described with reference to FIG. 5.

Figure 16:
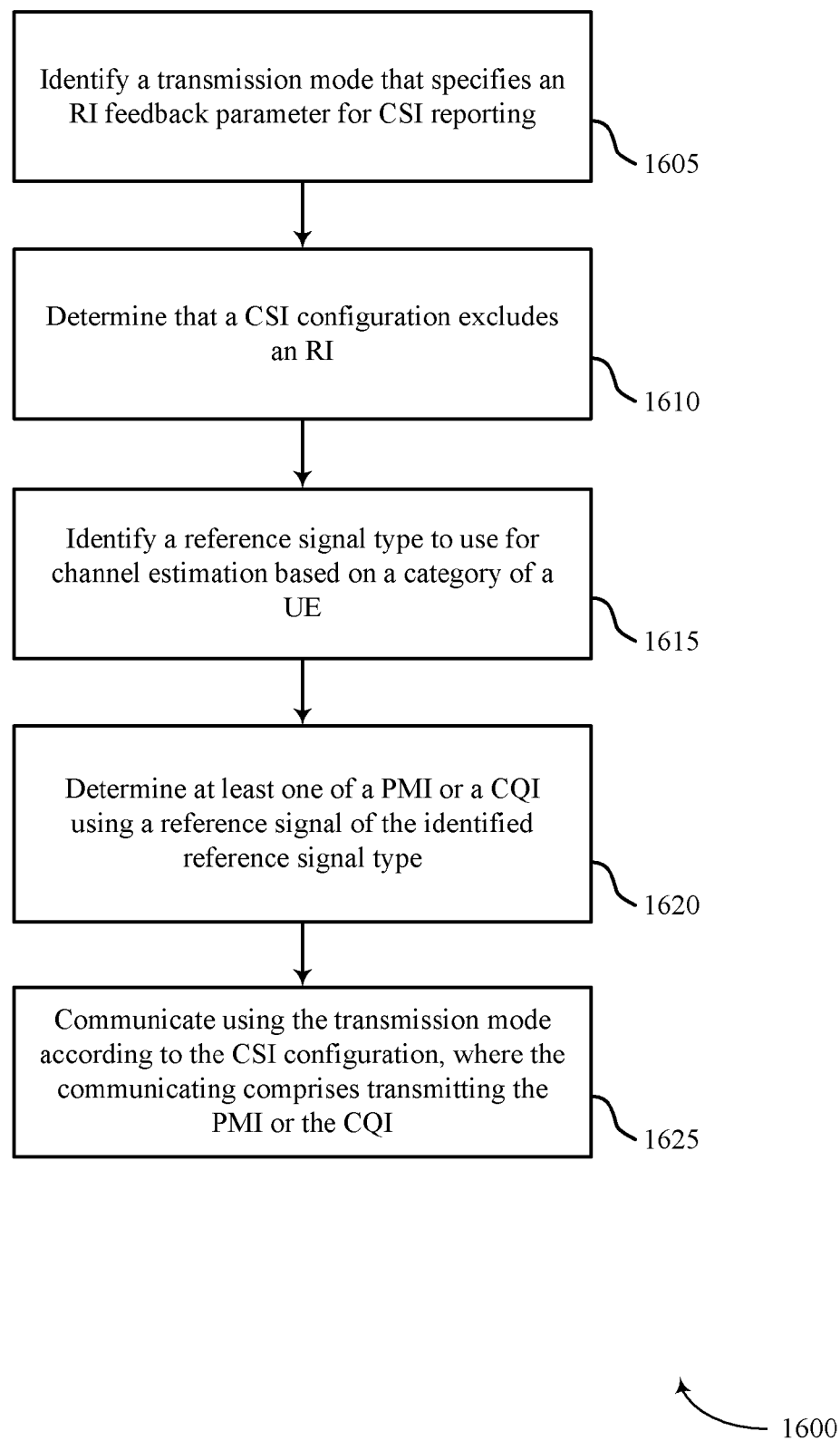

FIG. 16 shows a flowchart illustrating a method 1600 for modified CSI reporting for enhanced MTC in accordance with various aspects of the present disclosure. The operations of method 1600 may be implemented by a UE 115 or base station 105 or its components as described with reference to FIGS. 1 and 2. For example, the operations of method 1600 may be performed by the CSI manager as described herein. In some examples, the UE 115 or base station 105 may execute a set of codes to control the functional elements of the device to perform the functions described below. Additionally or alternatively, the UE 115 or base station 105 may perform aspects of the functions described below using special-purpose hardware.

At block 1605, the UE 115 or base station 105 may identify a transmission mode that specifies an RI feedback parameter for CSI reporting as described above with reference to FIGS. 2 through 3. In certain examples, the operations of block 1605 may be performed by the transmission mode component as described with reference to FIG. 5.

At block 1610, the UE 115 or base station 105 may determine that a CSI configuration excludes an RI as described above with reference to FIGS. 2 through 3. In certain examples, the operations of block 1610 may be performed by the CSI configuration component as described with reference to FIG. 5.

At block 1615, the UE 115 or base station 105 may identify a reference signal type to use for channel estimation based on a category of a UE as described above with reference to FIGS. 2 through 3. In certain examples, the operations of block 1615 may be performed by the reference signal component as described with reference to FIG. 5.

At block 1620, the UE 115 or base station 105 may determine at least one of a PMI or a CQI using a reference signal of the identified reference signal type, where the communicating includes transmitting the PMI or the CQI as described above with reference to FIGS. 2 through 3. In certain examples, the operations of block 1620 may be performed by the reference signal component as described with reference to FIG. 5.

At block 1625, the UE 115 or base station 105 may communicate using the transmission mode according to the CSI configuration as described above with reference to FIGS. 2 through 3. In certain examples, the operations of block 1625 may be performed by the transmission mode component as described with reference to FIG. 5.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for modified CSI reporting for enhanced MTC.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different PHY locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (wireless fidelity (Wi-Fi)), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for modified CSI reporting for enhanced MTC. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication at a user equipment (UE), comprising:
   identifying a transmission mode that specifies a rank indicator (RI) feedback parameter for channel state information (CSI) reporting;
   communicating an indication of a UE category of the UE, wherein the indication of the UE category is indicative of rank;
   transmitting a CSI report that includes a precoding matrix indicator (PMI) and excludes an RI based at least in part on the UE category; and
   communicating using the transmission mode.

2. The method of claim 1, wherein the PMI is based at least in part on the RI.

3. The method of claim 1, further comprising:
   estimating a matrix representative of a channel for the communicating;
   identifying, when a CSI configuration excludes an RI, a PMI based at least in part on a default rank for the UE category; and
   determining a channel quality indicator (CQI) that corresponds to the identified PMI, wherein the CQI and the PMI are transmitted in the CSI report.

4. The method of claim 1, further comprising:
   transmitting at least one of a PMI, an RI, or a CQI using a control channel if the PMI, RI, or CQI are available for transmission; and
   refraining from transmitting the control channel if the PMI, RI or CQI are unavailable for transmission.

5. The method of claim 1, further comprising:
   identifying a reference signal type to use for channel estimation based at least in part on the UE category of the UE;
   determining at least one of a PMI or a CQI using a reference signal of the identified reference signal type; and
   transmitting the PMI or the CQI.

6. The method of claim 5, wherein the identified reference signal type comprises a cell-specific reference signals (CRS).

7. An apparatus for wireless communication, comprising:
   means for identifying a transmission mode that specifies a rank indicator (RI) feedback parameter for channel state information (CSI) reporting;
   means for communicating an indication of a user equipment (UE) category of a UE, wherein the indication of the UE category is indicative of rank;
   means for transmitting a CSI report that includes a precoding matrix indicator (PMI) and excludes an RI based at least in part on the UE category; and
   means for communicating using the transmission mode.

8. The apparatus of claim 7, further comprising:
   means for estimating a matrix representative of a channel for the communicating;
   means for identifying, when a CSI configuration excludes an RI, a PMI based at least in part on a default rank for the UE category; and
   means for determining a channel quality indicator (CQI) that corresponds to the identified PMI, wherein the CQI and the PMI are transmitted in the CSI report.

9. The apparatus of claim 7, further comprising:
   means for transmitting at least one of a PMI, an RI, or a CQI using a control channel if the PMI, RI or CQI are available for transmission and refraining from transmitting the control channel if the PMI, RI or CQI are unavailable for transmission.

10. The apparatus of claim 7, further comprising:
    means for identifying a reference signal type to use for channel estimation based at least in part on the UE category of the UE;
    means for determining at least one of a PMI or a CQI using a reference signal of the identified reference signal type; and
    means for transmitting the PMI or the CQI.

11. The apparatus of claim 7, wherein the identified reference signal type comprises a cell-specific reference signals (CRS).

12. An apparatus for wireless communication, comprising:
    a processor;
    memory in electronic communication with the processor; and
    instructions stored in the memory and operable, when executed by the processor, to cause the apparatus to:
    identify a transmission mode that specifies a rank indicator (RI) feedback parameter for channel state information (CSI) reporting;
    communicate an indication of a user equipment (UE) category of a UE, wherein the indication of the UE category is indicative of rank;
    transmit a CSI report that includes a precoding matrix indicator (PMI) and excludes an RI based at least in part on the UE category; and
    communicate using the transmission mode.

13. The apparatus of claim 12, wherein the PMI is based at least in part on the RI.

14. The apparatus of claim 12, wherein the instructions are operable to cause the apparatus to:
    estimate a matrix representative of a channel for the communicating;
    identify, when a CSI configuration excludes an RI, a PMI based at least in part on a default rank for the UE category;
    determine a channel quality indicator (CQI) that corresponds to the identified PMI; and
    transmit the CQI and the PMI in the CSI report.

15. The apparatus of claim 12, wherein the instructions are operable to cause the apparatus to:
    transmit at least one of a PMI, an RI, or a CQI using a control channel if the PMI, RI or CQI are available for transmission; and
    refrain from transmitting the control channel if the PMI, RI or CQI are unavailable for transmission.

16. The apparatus of claim 12, wherein the instructions are operable to cause the processor to:
    identify a reference signal type to use for channel estimation based at least in part on the UE category of the UE;
    determine at least one of a PMI or a CQI using a reference signal of the identified reference signal type; and
    transmitting the PMI or the CQI.

17. The apparatus of claim 16, wherein the identified reference signal type comprises a cell-specific reference signals (CRS).

18. A non-transitory computer-readable medium storing code for wireless communication, the code comprising instructions executable to:
    identify a transmission mode that specifies a rank indicator (RI) feedback parameter for channel state information (CSI) reporting;
    communicate an indication of a user equipment (UE) category of a UE, wherein the indication of the UE category is indicative of rank;

transmit a CSI report that includes a precoding matrix indicator (PMI) and excludes an RI based at least in part on the UE category; and
communicate using the transmission mode.

* * * * *